United States Patent [19]

Scheibli et al.

[11] Patent Number: 4,801,694
[45] Date of Patent: Jan. 31, 1989

[54] TRIAZINYL REACTIVE DYESTUFFS IN WHICH TRIAZINYL GROUP IS FURTHER SUBSTITUTED WITH A BETA-CHLOROETHYLSULFONYL- OR VINYLSULFONYLBUTYRYLAMINO MOIETY

[75] Inventors: Peter Scheibli, Bottmingen; Karl Seitz, Oberwil; Herbert Seiler, Riehen; Athanassios Tzikas, Pratteln, all of Switzerland

[73] Assignee: Ciba-Geigy Corporation, Ardsley, N.Y.

[21] Appl. No.: 73,323

[22] Filed: Jul. 13, 1987

Related U.S. Application Data

[63] Continuation of Ser. No. 785,178, Oct. 7, 1985, abandoned.

[30] Foreign Application Priority Data

Oct. 15, 1984 [CH] Switzerland ............ 4931/84

[51] Int. Cl.⁴ .................. C09B 62/02; C09B 62/024; C09B 62/026; C09B 62/036
[52] U.S. Cl. ..................................... 534/637; 534/617; 534/618; 534/619; 534/622; 534/624; 534/625; 534/627; 534/628; 534/629; 534/632; 534/634; 534/635; 534/636; 534/638; 534/641; 534/643; 540/130; 540/132; 540/139; 544/75; 544/78; 544/181; 544/204; 544/208; 544/209
[58] Field of Search ............... 534/617, 622, 628, 629, 534/627, 632, 637, 638, 641, 642, 618, 619, 621, 625, 634, 635, 636, 643; 544/75, 78, 181, 204, 208, 209; 540/130, 132, 139

[56] References Cited

U.S. PATENT DOCUMENTS

| | | | |
|---|---|---|---|
| 3,223,470 | 12/1965 | Boedecker et al. | 534/638 X |
| 3,427,308 | 2/1969 | Barben et al. | 534/638 X |
| 3,455,897 | 7/1969 | Barben | 534/638 X |
| 3,474,084 | 10/1969 | Griffiths et al. | 534/638 X |
| 3,503,953 | 3/1970 | Loffelman | 534/638 X |
| 3,637,648 | 1/1972 | Kuhne et al. | 534/638 X |
| 3,663,156 | 5/1972 | Meininger et al. | 534/638 X |
| 3,926,942 | 12/1975 | Yelland | 534/638 X |
| 4,248,771 | 2/1981 | Scholl et al. | 534/638 X |
| 4,560,388 | 12/1985 | Rohrer | 534/638 X |

FOREIGN PATENT DOCUMENTS

| | | | |
|---|---|---|---|
| 1262875 | 6/1964 | France | 534/638 |
| 2084024 | 12/1971 | France | 534/638 |
| 1320921 | 6/1973 | United Kingdom | 534/638 |
| 1576237 | 10/1980 | United Kingdom | 534/641 |

OTHER PUBLICATIONS

Chem. Abstracts 89:112371r (Shirosaki et al.).
Chem. Abstracts 89:112372s (Shirosaki et al.).
Chem. Abstracts 84:123403a (Shirosaki et al.).

*Primary Examiner*—Floyd D. Higel
*Attorney, Agent, or Firm*—Wenderoth, Lind & Ponack

[57] ABSTRACT

Reactive dyes of the formula

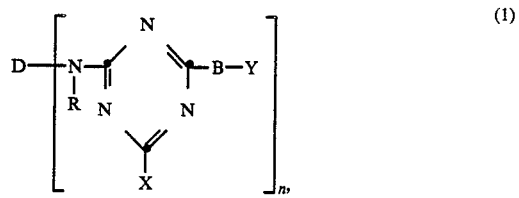

in which D is the radical of an organic dye of the monoazo, polyazo, metal complex azo, anthraquinone, phthalocyanine, formazan, azomethine, dioxazine, phenazine, stilbene, triphenylmethane, xanthene, thioxanthrone, nitroaryl, naphthoquinone, pyrenequinone or perylenetetracarbimide series, R is hydrogen or substituted or unsubstituted $C_{1-4}$-alkyl, X is a substituent which is detachable as an anion, B is a radical of the formula

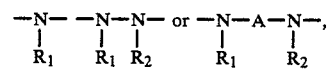

$R_1$ and $R_2$, independently of each other, are hydrogen or substituted or unsubstituted $C_{1-4}$-alkyl or phenyl, A is a substituted or unsubstituted aliphatic or aromatic bridge member, Y is a —CO—Z or —SO₂—Z radical, Z is an aliphatic, aromatic or heterocyclic reactive radical, and n is 1 or 2, are suitable for dyeing or printing cellulose-containing and nitrogen-containing materials and in high dyeing yield produce dyeings and prints having good fastness properties.

11 Claims, No Drawings

TRIAZINYL REACTIVE DYESTUFFS IN WHICH TRIAZINYL GROUP IS FURTHER SUBSTITUTED WITH A BETA-CHLOROETHYLSULFONYL- OR VINYLSULFONYLBUTYRYLAMINO MOIETY

This application is a continuation, now abandoned, of application Ser. No. 785,178, filed 10/7/85 (now abandoned).

The present invention relates to novel reactive dyes, to a process for their preparation and to their use for dyeing and printing fibre materials.

The practice of dyeing with reactive dyes has recently led to increased demands on the quality of the dyeings and the economics of the dyeing process. There consequently continues to be a demand for new reactive dyes which have improved properties, in particular application properties.

The present demand in the dyeing of cotton by the cold pad-bath method is for reactive dyes which have adequate substantivity at the low dyeing temperature and which also have good wash-off properties with respect to the unfixed portions. They should also have a high reactivity, so that only short batching times are necessary, and they should in particular produce dyeings having high degrees of fixation. These demands are met only inadequately by known dyes.

The present invention therefore has for its object to find new, improved reactive dyes for the cold pad-batch method which have the qualities characterised above to a high degree. The new dyes should be distinguished in particular by high degrees of fixation and high fibre-dye bond stabilities and moreover the portions not fixed on the fibre should be readily washed off. They should furthermore produce dyeings having good all-around fastness properties, for example light and wet fastness properties.

This object is achieved with the novel fibre-reactive dyes defined hereinafter.

The invention accordingly provides reactive dyes of the formula

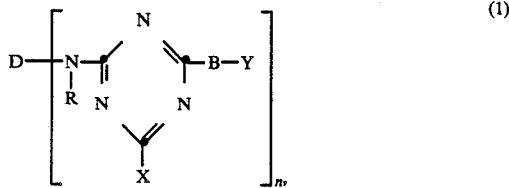

(1)

in which LD is the radical of an organic dye of the monoazo, polyazo, metal complex azo, anthraquinone, phthalocyanine, formazan, azomethine, dioxazine, phenazine, stilbene, triphenylmethane, xanthene, thioxanthrone, nitroaryl, naphthoquinone, pyrenequinone or perylenetetracarbimide series, R is hydrogen or substituted or unsubstituted $C_{1-4}$-alkyl, X is a substituent which is detachable as an anion, B is a radical of the formula

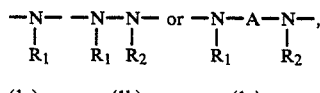

$R_1$ and $R_2$, independently of each other, are hydrogen or substituted or unsubstituted $C_{1-4}$-alkyl or phenyl, A is a substituted or unsubtituted aliphatic or aromatic bridge member, Y is a —CO—Z or —SO$_2$—Z radical, Z is an aliphatic, aromatic or heterocyclic reactive radical, and n is 1 or 2.

The radical D in the formula (1) can contain, bonded to its basic structure, the substituents customary with organic dyes.

Examples of further substituents in the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl and sulfo. Preferably the radical D contains one or more sulfo groups. Reactive dyes of the formula (1) in which D is the radical of an azo dye contain as substituents in particular methyl, ethyl, methoxy, ethoxy, acetylamino, benzoylamino, amino, chlorine, bromine, ureido, hydroxyl, carboxyl, sulfomethyl or sulfo.

An alkyl radical R can be straight-chain or branched; it can be further substituted, for example by halogen, hydroxyl, cyano, $C_{1-4}$-alkoxy, carboxyl or sulfo. Examples of R are the following radicals: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably R is hydrogen, methyl or ethyl.

The substituent X detachable as an anion is for example a halogen atom, such as fluorine, chlorine or bromine, a low-molecular alkylsulfonyl group, such as methylsulfonyl or ethylsulfonyl, a phenylsulfonyl radical or a sulfo or phosphono group. Preferably X is fluorine or chlorine.

Radicals $R_1$ and $R_2$ can be for example the same unsubstituted or substituted alkyl radicals as mentioned above for R. Phenyl $R_1$ or $R_2$ can be further substituted, for example by halogen atoms, such as fluorine, chlorine and bromine, alkyl groups having 1 to 4 carbon atoms, such as methyl, ethyl and propyl, alkoxy groups having 1 to 4 carbon atoms such as methoxy, ethoxy, propyloxy and isopropyloxy, carboxyl or sulfo.

The aliphatic or aromatic bridge member A is preferably an alkylene or arylene radical. The expression 'aliphatic bridge member' also includes cycloaliphatic radicals. For instance, A can be a long (for example having 10 or more carbon atoms) or shorter, straight-chain or branched alkylene radical, in particular an alkylene radical having 2 to 6 carbon atoms, for example ethylene, propylene, butylene, hexylene or cyclohexylene. An arylene radical A is for example a naphthylene radical, and the radical of a biphenyl or of stilbene or in particular a phenylene radical. The radical A can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo. Preferably A is $C_{2-6}$-alkylene or phenylene. The ethylene radical and the phenylene radical are preferred.

The radical Y is in particular a low-molecular alkanoyl or alkylsulfonyl radical which is substituted by a detachable atom or a detachable group; a low-molecular alkenoyl or alkenesulfonyl radical which can be substituted by a detachable atom or a detachable group; or a carbocyclic or heterocyclic radical which is bonded via a carbonyl or sulfonyl group, which is substituted by a detachable atom or a detachable group and which contains 4-, 5- or 6-membered rings.

Specific examples of the radical Y are: acryloyl, monochloroacryloyl, dichloroacryloyl or trichloroacryloyl such as —CO—CCl=CH$_2$, —CO—CH=CH—Cl, —CO—CCl=CH—CH$_3$; monobromoacryloyl, dibromoacryloyl or tribromoacryloyl such as —CO—CBr=CH$_2$, —CO—CH=CH—Br, —CO—CBr=CH—CH$_3$; as well as —CO—CCl=CH—COOH, —CO—CH=CCl—COOH, —CO—CBr=CH—COOH, —CO—CH=CBr—COOH; —CO—CCl=CCl—COOH, —CO—CBr=CBr—COOH; precursors of the acryloyl radical and of derivatives of the acryloyl radical such as β-chloropropionyl, β-bromopropionyl, 3-phenylsulfonylpropionyl, 3-methylsulfonylpropionyl, 3-chloro-3-phenylsulfonylpropionyl, 2,3-dichloropropionyl, 2,3-dibromopropionyl; as well as 2-fluoro-2-chloro-3,3-difluorocyclobutane-1-carbonyl, 2,2,3,3-tetrafluorocyclobutane-1-carbonyl or -1-sulfonyl,β-(2,2,3,3-tetrafluorocyclobut-1-yl)acryloyl,α- or β-alkylsulfonylacryloyl or -arylsulfonylacryloyl groups, such as α- or β-methylsulfonylacryloyl, propioloyl, chloroacetyl, bromoacetyl, 4-(β-chloroethylsulfonyl)-butyryl, 4-vinylsulfonylbutyryl, 5-(β-chloroethylsulfonyl)-valeryl, 5-vinylsulfonylvaleryl, 6-(β-chloroethylsulfonyl)-caproyl, 6-vinylsulfonylcaproyl; as well as 4-fluoro-3-nitrobenzoyl, 4-fluoro-3-nitrophenylsulfonyl, 4-fluoro-3-methylsulfonylbenzoyl, 4-fluoro-3-cyanobenzoyl and 2-fluoro-5-methylsulfonylbenzoyl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloro-6-methylpyrimidine-5-carbonyl or -5-sulfonyl, 2-methylsulfonyl-6-chloropyrimidine-4- or -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or -6-sulfonyl, 1,4-dichlorophthalazine-6-sulfonyl- or -6-carbonyl, 2,4-dichloroquinazoline-7- or -6-sulfonyl or -carbonyl, 2,4,6-trichloroquinazoline-7- or -8-sulfonyl, 2- or 3- or 4-(4′,5′-dichloropyridaz-6′-on-1′-yl)phenyl-sulfonyl- or -carbonyl, β-(4′,5′-dichloropyridaz-6′-inon-1′-yl)propionyl, 3,6-dichloropyridazine-4-carbonyl or -4-sulfonyl, 2-chlorobenzothiazole-5- or -6-carbonyl or -5- or -6-sulfonyl, 2-arylsulfonyl- or -alkylsulfonylbenzothiazole-5- or -6-carbonyl- or -5- or -6-sulfonyl, such as 2-methylsulfonylbenzothiazole- or 2-ethylsulfonylbenzothiazole-5- or -6-sulfonyl or -carbonyl, 2-phenylsulfonylbenzothiazole-5- or -6-sulfonyl- or carbonyl and the corresponding 2-sulfonylbenzothiazole-5- or -6-carbonyl or -sulfonyl derivatives which contain sulfo groups in the fused-on benzene ring, 2-chlorobenzoxazole-5- or -6-carbonyl or or -sulfonyl, 2-chlorobenzimidazole-5- or -6-carbonyl- or -sulfonyl, 2-chloro-1-methylbenzimidazole-5- or -6-carbonyl -sulfonyl, 2-chloro-4-methyl-1,3-thiazole-5-carbonyl or -4- or -5-sulfonyl; preference is given to 2,3-dibromopropionyl, 2,3-dichloropropionyl, α-bromoacryloyl, α-chloroacryloyl, 4-(β-chloroethylsulfonyl)-butyryl, 4-vinylsulfonylbutyryl, 2,4-dichloropyrimidine-5-carbonyl, 2,4-dichloropyrimidine-6-carbonyl and 2,3-dichloroquinoxaline-6-carbonyl.

The formula (1) part which is enclosed in square brackets is a reactive radical which can be present once or twice in the molecule; the two variants of the formula are of equal importance. If n is 2, the two reactive radicals can be identical or different; preferably the two radicals are identical. The reactive radical contains 2 substituents, X and Y, which are fibre-reactive leaving groups, for example in the case of X being F, or contain fibre-reactive leaving groups, for example when Y is chloroacetyl, or which can become active in the manner of fibre-reactive leaving groups, for example if Y is CH$_2$=CBr—CO—. Fibre-reactive compounds are to be understood as meaning those which are capable of reacting with the hydroxyl groups of cellulose, the amino, carboxyl, hydroxyl and thiol groups of wool and silk or with the amino and possibly carboxyl groups of nylons to form covalent chemical bonds.

Preferred embodiments of the reactive dyes of the formula (1) are:

(a) Reactive dyes of the formula (1) in which X is fluorine or chlorine.

(b) Reactive dyes as per (a) in which B is a radical of the formula (1c) and A is sulfophenylene.

(c) Reactive dyes as per (b) in which Y is α-bromoacryloyl, α,β-dibromopropionyl, α,β-dichloropropionyl, β-chloroethylsulfonylbutyryl, 2,4-dichloropyrimidine-5-carbonyl, 2,4-dichloropyrimidine-6-carbonyl or 2,3-dichloroquinoxaline-6-carbonyl.

The symbols of formula (1) which are not specifically mentioned in (a) to (c) are as defined in the explanation of the formula (1). Also possible are in particular combinations of features as per (a) to (c). Also preferred are:

(d) Reactive dyes of the formula (1) or as per (a) to (c) in which D is the radical of a monoazo or disazo dye.

(e) Reactive dyes of the formula (1) or as per (a) to (c) in which D is the radical of a metal complex azo or formazan dye.

(f) Reactive dyes of the formula (1) or as per (a) to (c) in which D is the radical of an anthraquinone dye.

(g) Reactive dyes as per (e) in which D is the radical of a 1:1 copper complex azo dye of the benzene or napthalene series and the copper atom is bonded to a metallisable group on either side, in ortho-position relative to the azo bridge.

Preference is given in particular to:

(h) Reactive dyes as per (d) of the formula

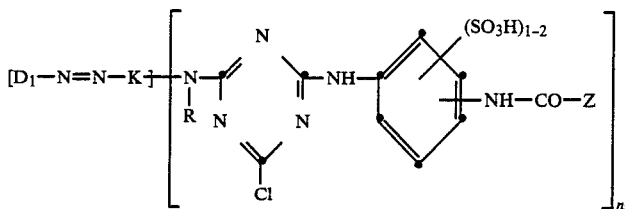

in which $D_1$ is the radical of a diazo component of the benzene or naphthalene series, K is the radical of a coupling component of the benzene or naphthalene series or of the heterocyclic series, R is hydrogen, methyl or ethyl, n is 1 or 2, Z is as defined for (d), and the reactive radical is bonded to the diazo component or to the coupling component, or one reactive radical each is bonded to the diazo component and to the coupling component.

(i) Reactive dyes as per (d) of the formula

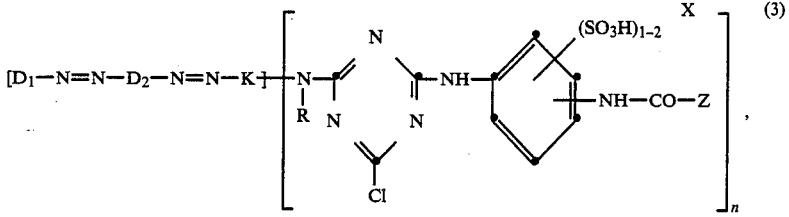

in which $D_1$ and $D_2$ are each a radical of a diazo component of the benzene or naphthalene series, K is the radical of a coupling component of the benzene or naphthalene series or of the heterocyclic series, R is hydrogen, methyl or ethyl, n is 1 or 2, Z is as defined for (d), and the reactive radical is bonded to the diazo component $D_1$ or to the coupling component K, or one reactive radical each is bonded to $D_1$ and K.

(j) Reactive dyes as per (d) of the formula

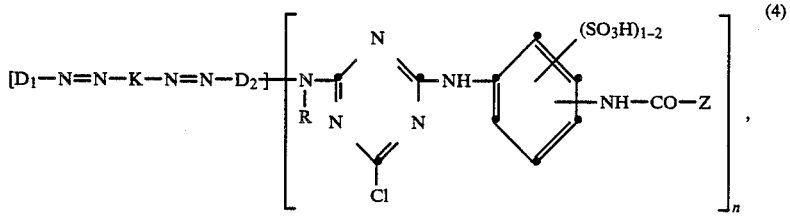

in which $D_1$ and $D_2$ are each a radical of a diazo component of the benzene or naphthalene series, K is the radical of a coupling component of the aminonaphtholsulfonic acid series, R is hydrogen, methyl or ethyl, n is 1 or 2, Z is as defined for (d), and the reactive radical is bonded to the diazo component $D_1$ or to the diazo component $D_2$, or one reactive radical each is bonded to $D_1$ and $D_2$.

(k) 1:1 copper complexes of reactive dyes as per (h) to (j).

The process for preparing the reactive dyes of the formula (1) comprises condensing organic dyes of the formula

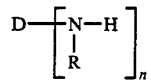

$$D \mathrm{-\!\!\!-\!\!\!-}\left[ \begin{array}{c} N-H \\ | \\ R \end{array} \right]_n \quad (5)$$

or dye precursors, at least one equivalent of a triazine of the formula

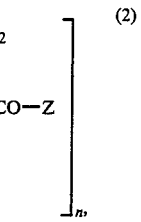

at least one equivalent of a compound of the formula $$H-B-H \quad (7)$$

and at least one equivalent of an agent introducing the radical Y in any order to form a reactive dye of the formula (1), D, R, n, X and b in the formulae (5) to (7) and Y being as defined under the formula (1), and in the case of the use of dye precursors converting these into the desired final dyes.

If desired, the process according to the invention is followed by a further conversion reaction. The reactions involved in the preparation of the final dyes from precursors are in particular couplings which lead to azo dyes.

Since the individual process steps mentioned above can be carried out in various orders, if desired in some cases even simultaneously, various process variants are possible. In general, the reaction is carried out in successive steps in which the order of the elementary reactions between the individual reactants advantageously depends on the specific conditions.

It depends on the structure of the starting materials, which of the possible process variants gives the best results or under which specific conditions, for example at which condensation temperature, the reaction is best carried out.

Since under certain conditions the halogenotriazine radical undergoes hydrolysis, an intermediate which contains acetylamino groups needs to be hydrolysed to split off the acetyl groups before being condensed with a halogenotriazine. Which reaction for example in the preparation of a secondary condensation product from a compound of the formula (7), the triazine of the formula (6) and the organic dye of the formula (5) or a precursor is advantageously carried out first, that of the triazine with the compound of the formula (7) or that with the organic dye or a precursor of the dye, varies from case to case and depends in the main on the solubility of the amino compounds involved and on the basicity of the amino groups to be acylated.

In a modified embodiment of the process, the first step is to prepare a dye which contains a precursor of the reactive radical and subsequently to convert this precursor into the final stage, for example by esterification or an addition reaction. For instance, it is possible to prepare a dye in which Y is an HO—CH$_2$CH$_2$—SO$_2$— radical, and to react the intermediate with sulfuric acid before or after the acylation, so that the hydroxyl group is converted into a sulfato group; or to use an analogous dye in which Y is the group H$_2$C=CH—SO$_2$, and to add thiosulfuric acid onto the intermediate to form an HO$_3$SS—CH$_2$CH$_2$—SO$_2$ radical. The sulfation of the hydroxyl group in a dye of the formula (1) or a suitable precursor is effected for example by reaction with concentrated sulfuric acid at 0° C. to moderately elevated temperature. The sulfation can also be effected by reacting the hydroxy compound with two equivalents of chlorosulfonic acid per hydroxyl group in a polar organic solvent, for example N-methylpyrrolidone, at 10° to 80° C. Preferably the sulfation is effected by adding the compound in question to sulfuric acid monohydrate at temperatures between 5° and 15° C. The introduction of another radical detachable under alkalkine conditions into a compound of the formula (1) or an intermediate in place of the sulfato group, for example a thiosulfato group, is effected in a manner known per se. The preparative pathway via an intermediate in place of the sulfato group, for example a thiosulfato group, is effected in a manner known per se. The preparative pathway via an intermediate of the reactive radical proceeds in many cases to a single compound and completion.

The process variant where the starting materials are dye precursors is suitable for preparing reactive dyes of the formula (1) in which D is the radical of a dye composed of two or more than two components: monoazo, disazo, trisazo, metal complex azo, formazan and azomethine dyes. In principle, the reactive dyes of the formula (1) of all dye classes can be prepared in a manner known per se or analogously to known procedures by starting from precursors or intermediates for dyes which contain fibre-reactive radicals as per the formula (1) or by introducing these fibre-reactive radicals into intermediates suitable for this purpose and having dye character.

Preference is given to reactive dyes of the formula (1) in which D is the radical of a monoazo or disazo dye or of a metal complex azo dye. In this case the reactive radicals of the formula

are bonded to the diazo or coupling component or, if n is 2, to different or identical radicals of starting components, i.e. diazo or coupling components. Preferably, in the case where n is 2, the two reactive radicals are bonded to one component each, namely to a diazo component or a coupling component. The reactive dyes then have for example the formulae

and

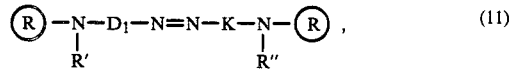

in which R$_1$ and R$_2$, independently of each other, are defined in the same way as R in the formula (1), D$_1$ is the radical of a diazo component, K is the radical of a coupling component, and (R) is a reactive radical of the formula (8). Also possible are reactive dyes of the formulae (9) to (11) in which the radical D$_1$ and/or K includes a further reactive radical, so that tri- and higher-reactive dyes are also included. The additional reactive radicals included in D$_1$ or K can like (R), be bonded to D$_1$ or K via amino groups or in some othe way, for example through a direct bond.

An additional reactive radical which can be included in D$_1$ or K is in particular a low-molecular alkanoyl or alkylsulfonyl radical which is substituted by a detachable atom or a detachable group; a low-molecular alkenoyl or alkenesulfonyl radical which can be substituted by a detachable atom or a detachable group; a carbocyclic or heterocyclic radical which is bonded via a carbonyl or sulfonyl group, which is substituted by a detachable atom or a detachable group and which contains 4-, 5- or 6-rings; or a triazine or pyrimidine radical which is bonded directly via a carbon atom and is substituted by a detachable atom or a detachable group; or contains such a radical. Examples of such reactive radicals are a 6-membered heterocyclic radical which is bonded via an amino group and contains halogen atoms, such as a halogenotriazine or halogenopyrimidine radical or an aliphatic acyl radical such as a halogenoacetyl or halogenopropionyl radical.

In particular, the additional reactive radical is a vinylsulfonyl, β-sulfatoethylsulfonyl, β-thiosulfatoethylsulfonyl, β-chloroethylsulfonyl or β-acetoxyethylsulfonyl radical bonded directly or via a bridge member.

The above explanations apply mutatis mutandis also to disazo dyes and metal complex azo dyes as well as to other chromophores mentioned in the definition of the dye radical D in the formula (1).

If the starting materials used are dye precursors, the reactive dyes of the formula (1) are obtained by condensing a component of the dye of the formula (5) which contains a —N(R)H group and a triazine of the formula (6), condensing beforehand or afterwards with a compound of the formula (7), and reacting with the other component of the dye of the formula (5). In preparing the preferred azo dyes, the diazo components and the coupling components together need to contain at least one —N(R)H amino group and can contain further amino groups. In this case the diazo components used are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired, use is made of corresponding acetylamino or nitro compounds in which the acetylamino or nitro group is converted into the H$_2$N group by hydrolysis or reduction respectively before the condensation with the 2,4,6-trihalogenotriazine.

If groups capable of metal complex formation are present in the reactive dyes prepared, such as hydroxyl, carboxyl, amino or sulfo, the reactive dyes can also be subsequently metallised. For instance, metal complex azo dyes are obtained by treating azo compounds obtained according to the invention which contains complexing groups, for example hydroxyl or carboxyl groups, in ortho-ortho' position relative to the azo bridge with agents giving off heavy metal before or if desired after the condensation with the 2,4,6-trihalogenotriazine of the formula (6). Copper complexes of reactive dyes of the formula (1) are of particular interest. Suitable metallisation methods, in addition to that mentioned above, also include dealkylating metallisation and, for the preparation of copper complexes, oxidative coppering.

The most important process variants are described in the illustrative embodiments.

There now follows a detailed list of possible starting materials which can be used for preparing the reactive dyes of the formula (1).

Organic dyes of the formula (5)

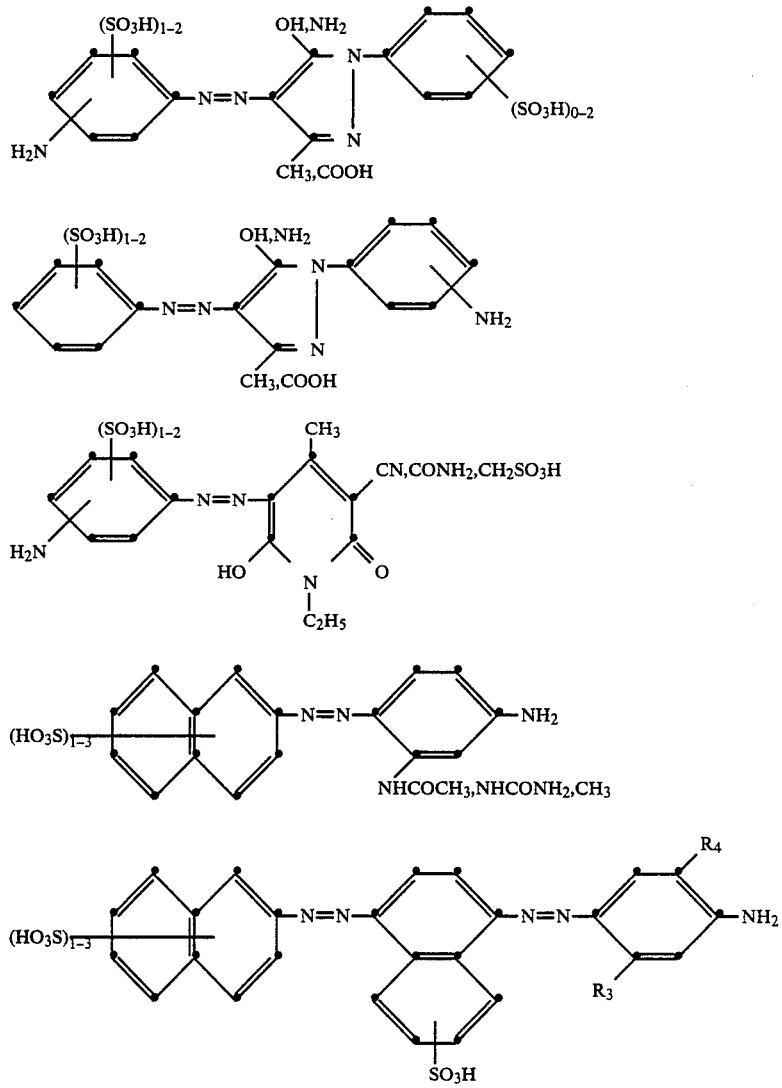

-continued
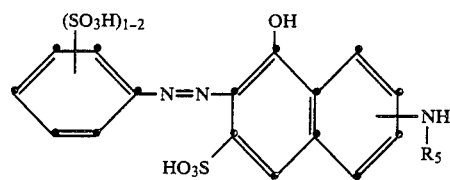
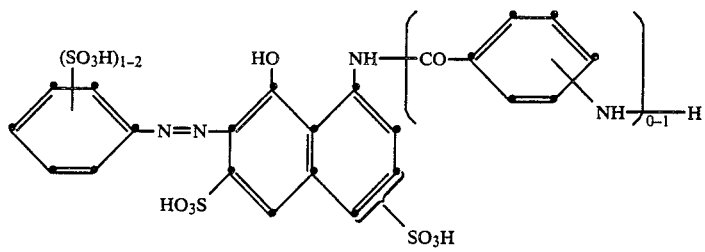
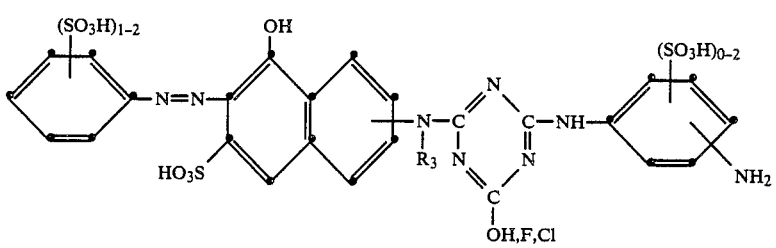
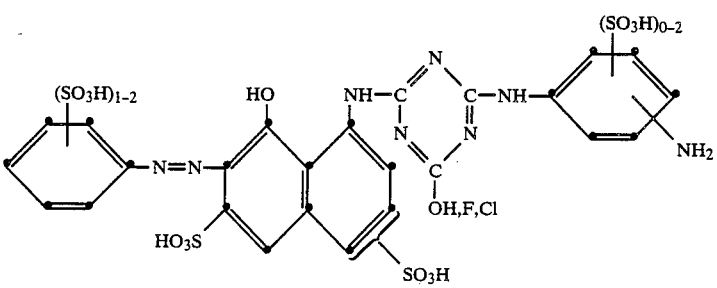
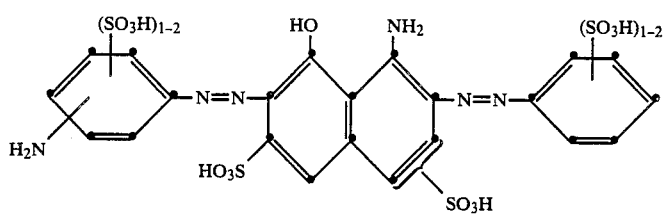
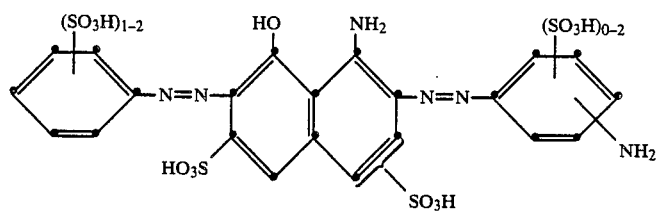
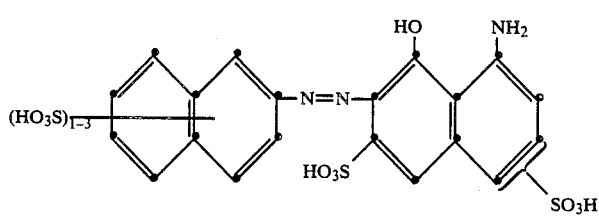

-continued
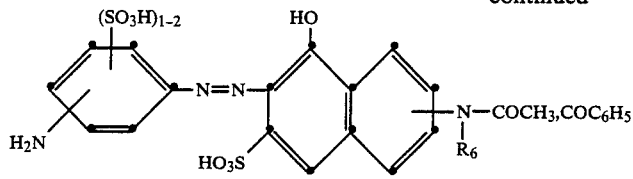
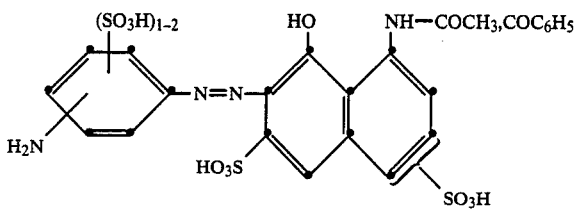
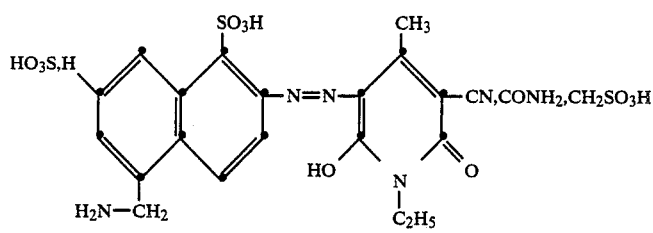
Metal complexes of dyes of the formulae:
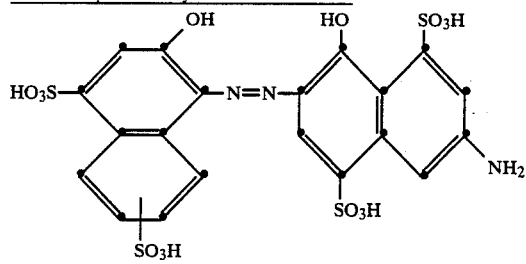
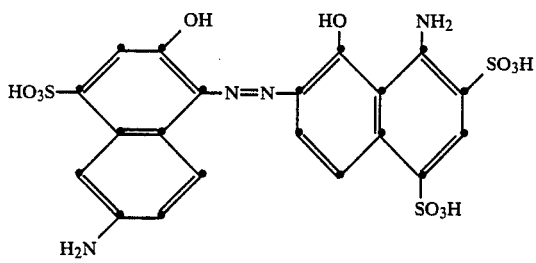
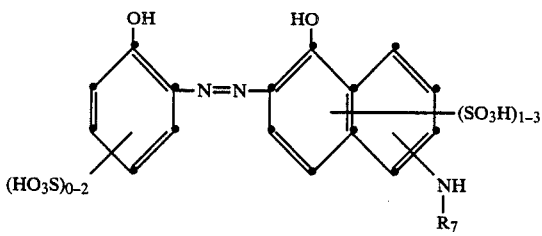
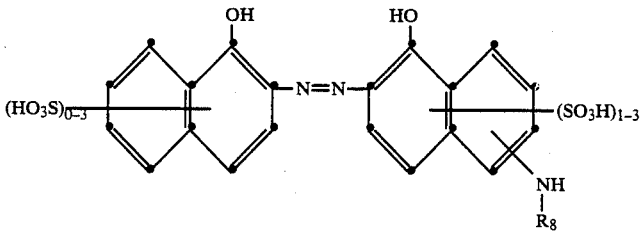

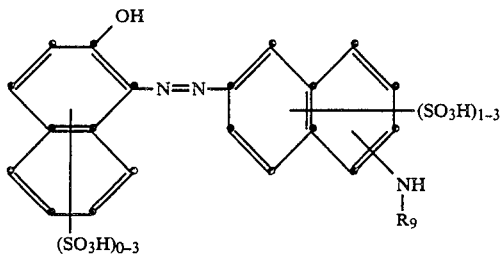

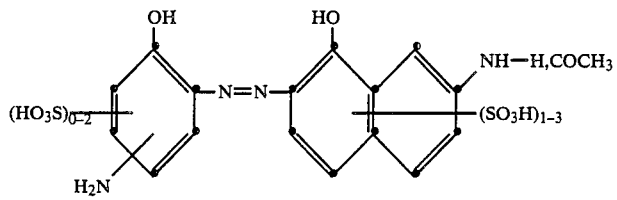

Preferred metal atoms are Cu (1:1 complex) or Cr and Co (1:2 complex). Cr- and Co-complexes can contain the azo compound of the abovementioned formula once or twice, i.e. they can be of symmetrical structure or, by incorporating any other ligands, of asymmetrical structure.

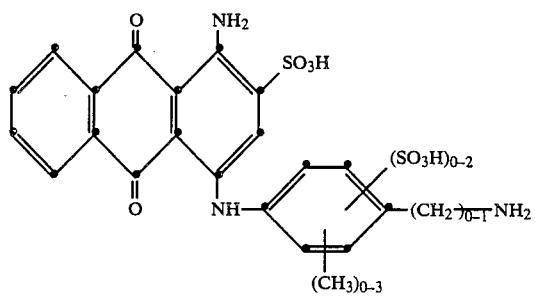

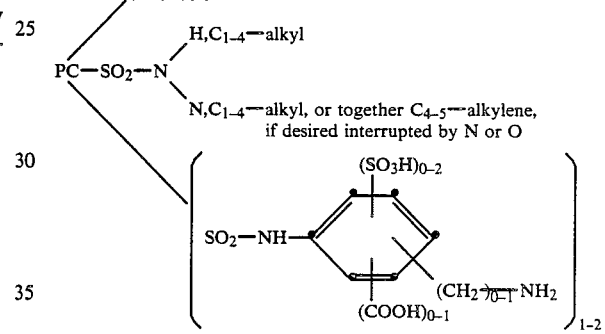

In this formula, Pc is the Cu- or Ni-phthalocyanine radical, and the total number of substituents on the Pc skeleton is 4.

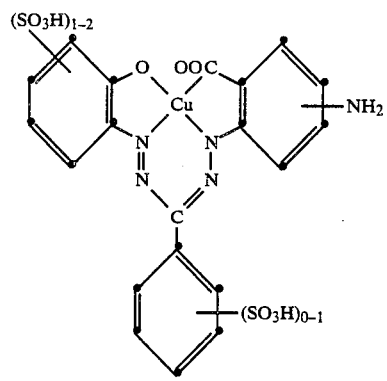

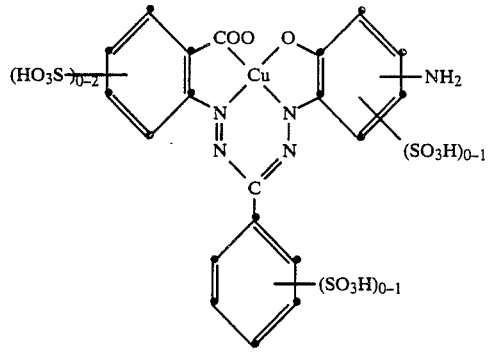

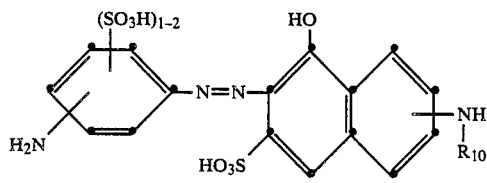

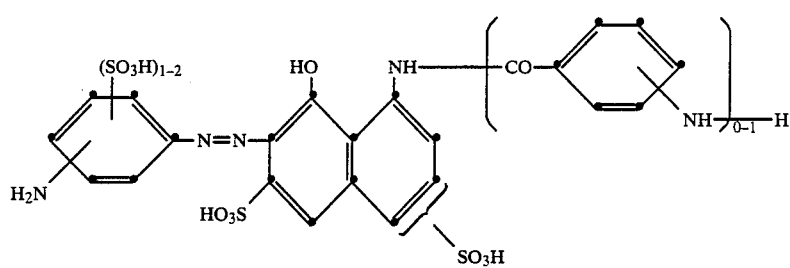
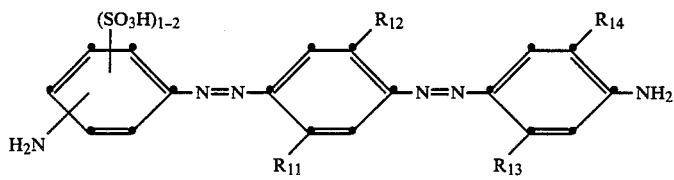
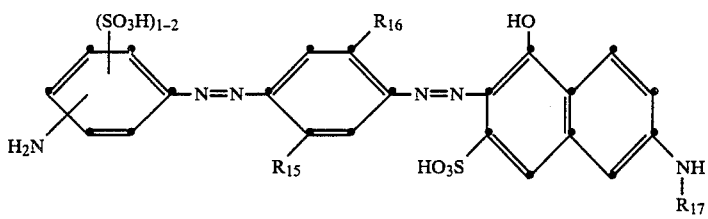
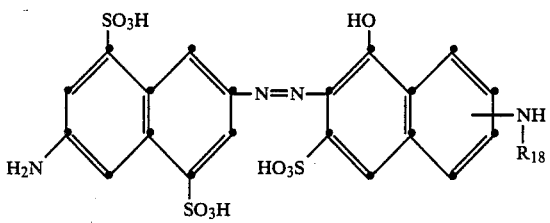
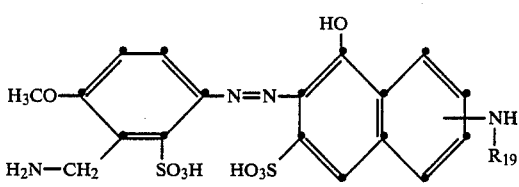
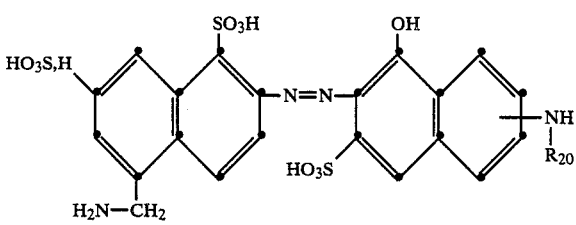
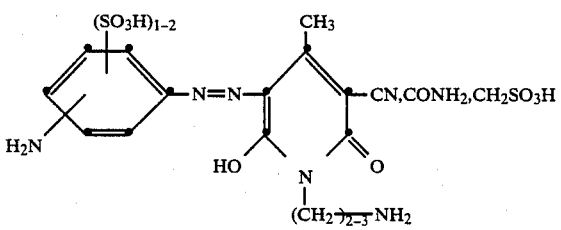

-continued
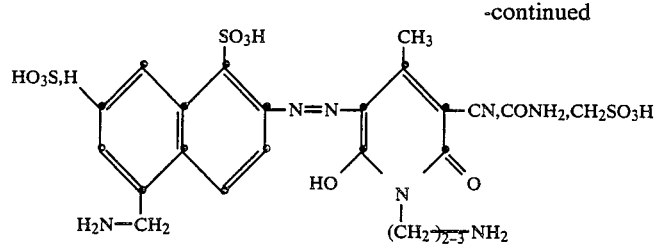
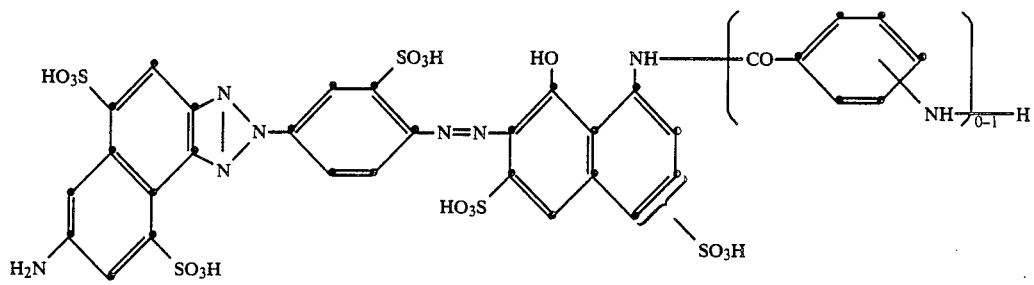
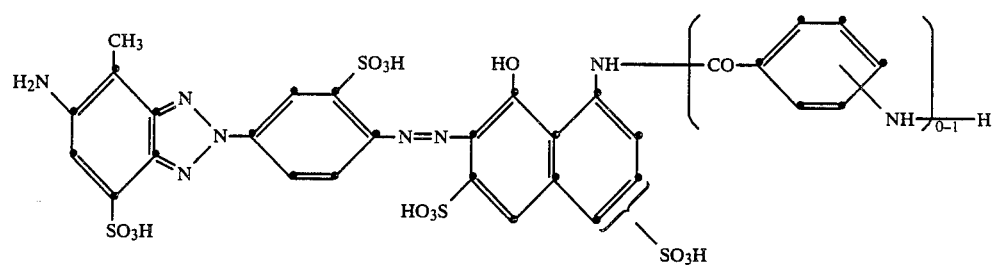
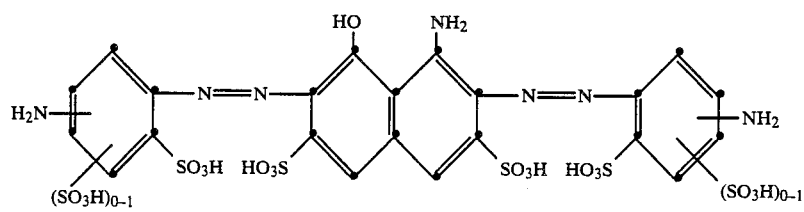
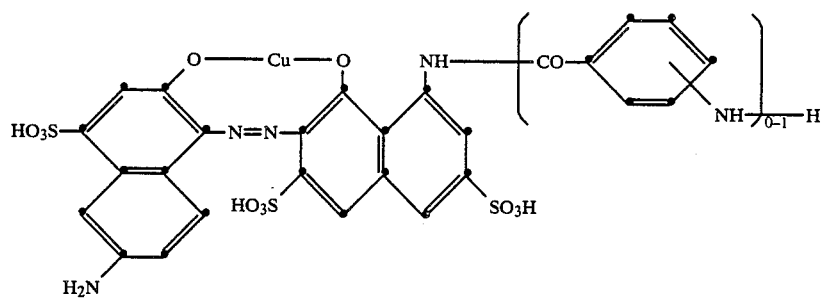
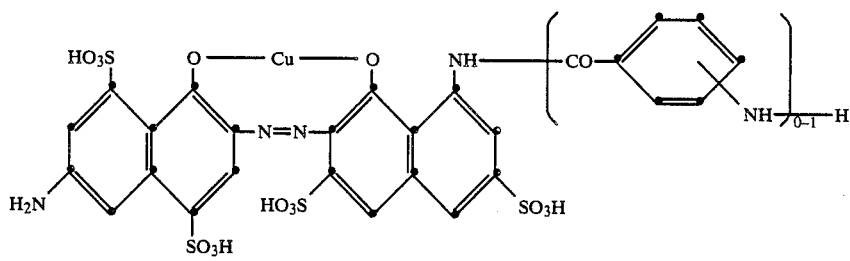

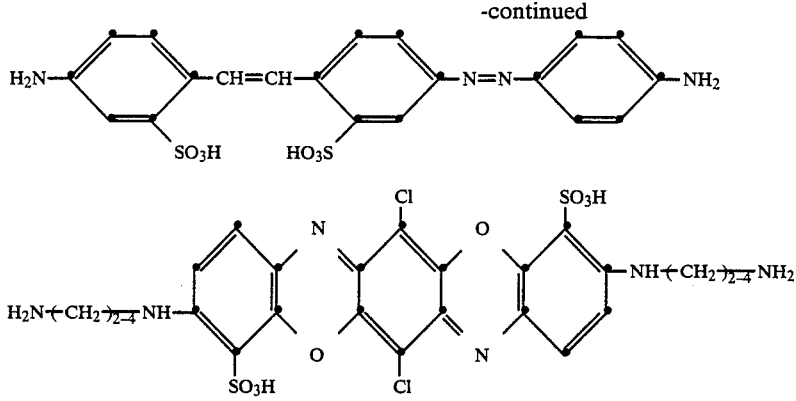

In the formulae listed above, the radicals $R_5$ to $R_{10}$ and $R_{17}$ to $R_{20}$ are hydrogen or $C_{1-4}$-alkyl, and the radicals $R_3$, $R_4$ and $R_{11}$ to $R_{16}$ are hydrogen, $C_{1-4}$-alkyl, $C_{1-4}$-alkoxy, $C_{1-4}$-alkanoylamino, ureido or halogen, the radicals $R_3$, $R_4$ ... etc. which belong to one and the same formula being independent of one another. Preferably the radicals $R_5$ to $R_{10}$ and $R_{17}$ to $R_{20}$ are hydrogen, methyl or ethyl and the radicals $R_3$, $R_4$ and $R_{11}$ to $R_{16}$ are hydrogen, methyl, ethyl or methoxy, ethoxy, acetylamino, ureido or chlorine. The aromatic rings in the above dyes can be further substituted, the benzene rings in particular by methyl, methoxy, ethoxy, carboxyl, acetylamino or chlorine and the naphthalene rings in particular by methoxy, carboxyl, acetylamino, nitro or chlorine; the same applies to the anthraquinones, dioxazines and so on. Preferably the benzene rings are not further substituted. The diazo components used in this case are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid.

Specific examples of diazo and coupling components are:

Diazo components

Aminobenzene, 1-amino-2-, -3- or -4-methylbenzene, 1-amino-2-, -3- or -4-methxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4aminobiphenyl, 1-aminobenzene-2-, -3- or -4-carboxylic acid, 2-aminodiphenyl ether, 1-aminobenzene-2-, -3- or -4-sulfonamide, -N-methylamide, -N-ethylamide, -N,N-dimethylamide or -N,N-diethylamide, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4, -5-, -6-, -7- or -8-sulfonic acid, 2-aminonaphthalene-3,6- or -5,7-disulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphtalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4- diamino-2-methylbenzene-5-sulfonic acid, 1,5-diamino-6-methylbenzene-3-sulfonic acid, 1,3-diamino-6-methylbenzene-4-sulfonic acid, 3-(3'- and 4'-aminobenzoylamino)-1-aminobenzene-6-sulfonic acid, 1-(4'-aminobenzylamino)-4-aminobenzene-2,5-disulfonic acid, 1,4-diaminobenzene-2-carboxylic acid, 1,3-diaminobenzene-4-carboxylic acid, 1,3-diaminobenzene-4-carboxylic acid, 1,3-diaminobenzene-5-carboxylic acid, 1,4-diaminobenzene-2-methylbenzene, 4,4'-diaminodiphenyl oxide, 4,4'-diaminodiphenyl urea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If the diazo component to be used is not to be a diamine but an aminoacetylamino compound from which the acetyl group is subsequently reeliminated by hydrolysis, as is described above in the explanation of the process variants, the monoacetyl compounds of the abovementioned diazo components, for example 1-acetylamino-3-aminobenzene-4-sulfonic acid or 1-acetylamino-4-aminobenzene-3-sulfonic acid, are possible.

Coupling components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2hydroxynaphthalene-3,6- or -6,8-disulfonic acid, 1-hydroxynpahthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenyl urea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hyroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4α-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazol-5-one, 1-phenyl-3-methyl-5-pyrazolone, 1-(4'-sulfophenyl)-3-methyl-5-pyrazolone, 1-(4'-sulfophenyl)-pyrazol-5-one-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2'-yl)-3-methyl-5-pyrazolone, 1-(5',7'-disulfonaphth-2'-yl)-3-methyl-5-pyrazolone, 1-(2',5'-dichloro-4'-sulfophenyl)-3-methyl-5-pyrazolone, 3-aminocarbonyl-4-methyl-6hydroxypyrid-2-one, 1-ethyl-3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hyroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)naphthalene-3,6-disulfonic acid, 1-amino-8-hydroxy-2-(4'-sulfophenylazonaphthalene-3,6-disulfonic acid, 1-amino-8-hydroxy-2-(2',5'-disulfophenylazo)-naphthalene-3,6-disulfonic acid, 1-β-aminoethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1amino-3-sulfobenzylamino-4-chlorobenzene, 1-amino-3-N,N-disulfobenzylaminobenzene.

Triazines of the formula (6)

2,4,6-Trifluoro-s-triazine (cyanuric fluoride), 2,4,6-trichloro-s-triazine (cyanuric chloride), 2,4,6-tribromo-s-triazine (cyanuric bromide).

Compounds of the formula (7)

Ammonia, methylamine, ethylamine, propylamine, isopropylamine, butylamine, amylamine, β-chloroethylamine, β-bromoethylamine, β-cyanoethylamine, β-hydroxyethylamine, γ-hydroxypropylamine, methoxymethylamine, β-methoxyethylamine, γ-methoxypropylamine, ethoxymethylamine, β-ethoxyethylamine, γ-ethoxypropylamine, γ-isopropoxypropylamine, benzylamine, aniline, hydrazine, methylhydrazine, phenylhydrazine, sulfophenylhydrazine, methylenediamine, ethylenediamine, n-propylenediamine, n-butylenediamine, 1-methyl-n-propylenediamine, n-hexylenediamine, 2-ethyl-n-butylenediamine, 2-hydroxy-n-propylenediamine, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, piperazine.

Reactive components (Y)

The halides of the abovementioned radicals Y, for example, α,β-dibromopropionyl chloride, α,β-dichloropropionyl chloride, α-bromoacryloyl chloride, α-chloroacryloyl chloride, and if desired also similarly reacting halogenated acid anhydrides, such as α,β-dichloropropionic anhydride, 4-(β-chloroethylsulfonyl)-butyryl chloride, 4-vinylsulfonylbutyryl chloride and so on.

The diazotisation of the diazo components or of intermediates containing a diazotisable amino group is generally effected by the action of nitrous acid in aqueous mineral acid solution at low temperature. The coupling onto the coupling component is effected at strongly acid, neutral or weakly alkaline pH.

The condensation of 2,4,6-trihalogeno-s-triazine with the organic dyes of the formula (5) or with the —N(R)H-containing diazotisable and/or couplable components is preferably effected in aqueous solution or suspensions, at low temperatures, preferably between 0° and 5° C. and at weakly acid, neutral or weakly alkaline pH. Advantageously the hydrogen halide liberated in the course of the condensation is cntinuously neutralised by addition of aqueous alkali metal hydroxides, carbonates or bicarbonates. For the further reaction of the halogenotriazine dyes thus obtained and for the reaction of the 2,4,6-trihalogeno-s-triazine with the compounds of the formula (7), the free amines or their salts, preferably in the form of the hydrochloride, are used. The reaction is carried out at temperatures between about 0° and 40°, preferably between 5° and 25° C., in the presence of acid-binding agents, preferably sodium carbonate, within the pH range from 2 to 8, preferably 5 to 6.5.

The condensation of the halogentriazine with a compound of the formula (7) can be carried out before or after the condensation of the halogenotriazine with a dye of the formula (5). The condensation of the halogentriazine with a compound of the formula (7) is preferably effected in aqueous solution or suspension at low temperature and at weakly acid or neutral pH. In this case too the hydrogen halide liberated in the course of the condensation is advantageously neutralised by uninterrupted addition of aqueous alkali metal hydroxides, carbonates or bicarbonates.

The condensation of the compound of the formula (7) with an agent introducing the radical Y is likewise preferably effected in aqueous solution or suspension at low temperatures and at weakly acid, neutral or weakly alkaline pH and in the presence of an acid-binding agent.

The reactive dyes of the formula (1) are suitable for dyeing and printing a very wide variety of materials, such as silk, leather, wool, nylon fibres and polyurethanes, and in particular cellulose-containing fibre materials of any kind. These fibre materials are for example the natural cellulose fibre, such as cotton, linen and hemp, and wood pulp and regenerated cellulose. The reactive dyes of the formula (1) are also suitable for dyeing or printing hydroxyl-containing fibres which are contained in blend fabrics, for example blends of cotton with polyester fibres or nylon fibres.

The dyes according to the invention can be applied to the fibre material and be fixed on the fibre in various ways, in particular in the form of aqueous dye solutions and print pastes. They are suitable not only for the exhaust method of dyeing but also for dyeing by the pad dye method, whereby the cloth is impregnated with aqueous dye solutions which can, if desired, also contain salt, and the dyes are fixed after an alkali treatment or in the presence of alkali, if desired with heating. They are particularly suitable for the so-called cold pad-batch method, whereby the dye is applied together with the alkali on a pad-mangle and is then fixed by storing at room temperature for a plurality of hours. After fixing, the dyeings and prints are thoroughly rinsed with cold and hot water, if desired in the presence of an agent which acts like a dispersant and promotes the diffusion of the unfixed portions.

The reactive dyes of the formula (1) are distinguished by high reactivity and good fixing properties. They can therefore be used in the exhaust dyeing method at low dyeing temperatures and only require short steaming times in the pad-steam method. The degrees of fixation are high, and the unfixed portions can be readily washed off, the difference between the degree of exhaustion and the degree of fixation being remarkably small, i.e. the hydrolysis loss being very low. The reactive dyes of the formula (1) are also suitable for printing, especially on cotton, but also for printing nitrogen-containing fibres, for example wool, silk or wool-containing blend fabrics.

The dyeings and prints on cellulose fibre material prepared with the dyes according to the invention have a high tinctorial strength and a high fibre-dye bond stability not only in the acid but also in the alkaline range, as well as a good light fastness and very good wet fastness properties, such as wash, water, seawater, cross-dyeing and perspiration fastness properties, and a good pleating fastness, hot press fastness and rub fastness.

The following examples serve to illustrate the invention. The temperatures are given in degrees celsius, and parts and percentages are by weight unless otherwise stated. Parts by weight relate to parts by volume as the kilogramme relates to the liter.

The preparation of the monoazo or disazo intermediate is not described in all cases in the illustrative embodiments below, but it is readily evident from the general description.

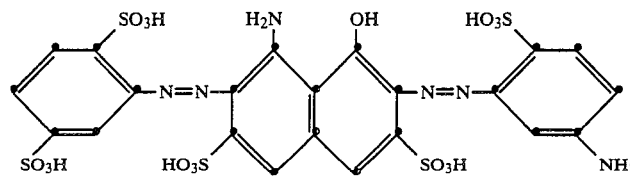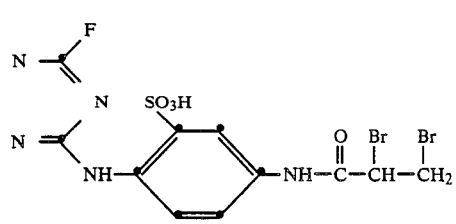

EXAMPLE 1

20.1 parts of 1-amino-4-(2,3-dibromopropionylamino)benzene-2-sulfonic acid are dissolved in 500 ml of water under neutral conditions, and the solution is cooled down to 0° to 5°. At this temperature 7.1 parts of 2,4,6-trifluoro-1,3,5-triazine are added dropwise in the course of 20 minutes during which the pH of the reaction mixture is maintained at 6.5 by simultaneous addition of 2N sodium hydroxide solution. After addition of a neutral solution of 35.2 parts of the dye of the formula

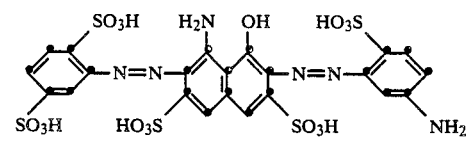

in 300 ml of water, the temperature is raised to 20° to 25° in the course of 2 to 3 hours during which the pH of the reaction mixture is maintained at 6.5 to 7.5 by continuous addition of 2N sodium hydroxide solution. After the reaction has ended, the reaction mixture is clarified, and the resultant reactive dye of the formula is salted out at pH 6.5 by addition of potassium chloride, is filtered off, is washed and is dried in vacuo. It dyes cotton in blue shades.

Example 1 is repeated, except that the 20.1 parts of 1-amino-4-(2,3-dibromopropionylamino)-benzene-2-sulfonic acid are condensed not with 7.1 parts of 2,4,6-trifluoro-1,3,5-triazine but with 9.7 parts of 2,4,6-trichloro-1,3,5-triazine, affording a further useful reactive dye of the formula

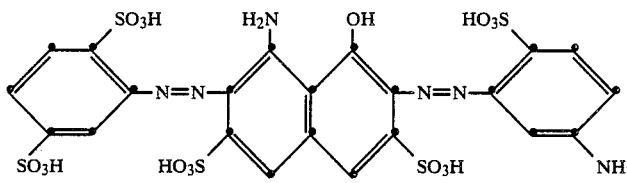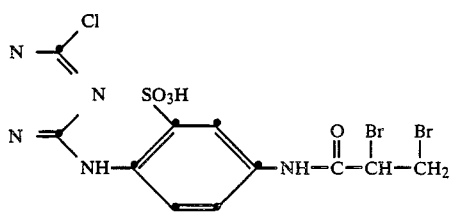

It dyes cotton in blue shades.

Further useful reactive dyes which dye cotton in the shades indicated in Table 1 column 4 are obtained when the amino-containing intermediate indicated in colunn 2 is reacted in accordance with the indications in Example 1 first with 2,4,6-trifluoro-1,3,5-triazine or with 2,4,6-trichloro-1,3,5-triazine and then with the amino-containing chromophore indicated in column 3.

Preparation variant: Using a procedure similar to that described in Example 1 it is also possible first to react the amino-containing chromophore of Table 1 column 3 with the triazine and then to condense the resulting condensation product further with the intermediate indicated in column 2.

TABLE 1

| No. | Intermediate | Chromophore | Hue on cotton |
|---|---|---|---|
| 1 | 1-Amino-5-(2,3-dibromopropionylamino)-benzene-2-sulfonic acid | 2-Aminonaphthalene-3,6,8-trisulfonic acid ⟶ 1-amino-3-acetylaminobenzene | reddish yellow |
| 2 | 1-Amino-5-(2,3-dibromopropionylamino)-benzene-2-sulfonic acid | 2-Aminonaphthalene-3,6,8-trisulfonic acid ⟶ 3-aminophenylurea | reddish yellow |
| 3 | 1-Amino-5-(2,3-dibromopropionylamino)-benzene-2-sulfonic acid | 1-Amino-3-acetylaminobenzene-6-sulfonic acid ⟶ 1-ethyl-3-sulfomethyl-4-methyl-6-hydroxypyrid-2-one-5-carboxamide, hydrolysed | yellow |
| 4 | 1-Amino-5-(2,3-dibromopropionylamino)-benzene-2-sulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 5 | 1-Amino-5-(2,3-dibromopropionylamino)-benzene-2-sulfonic acid | 2-Aminonaphthalene-1,5-disulfonic acid ⟶ 2-acetylamino-5-hydroxynaphthalene-7-sulfonic acid, hydrolysed | orange |
| 6 | 1-Amino-5-(2,3-dibromopropionylamino)-benzene-2-sulfonic acid | 2-Aminonaphthalene-3,6,8-trisulfonic acid ⟶ 2-acetylamino-5-hydroxynaphthalene-7-sulfonic acid, hydrolysed | orange |
| 7 | 1-Amino-5-(2,3-dibromopropionylamino)-benzene-2-sulfonic acid | 1-Amino-4-methoxybenzene-2-sulfonic acid ⟶ 2-amino-5-hydroxynaphthalene-7-sulfonic acid | scarlet |
| 8 | 1-Amino-5-(2,3-dibromopropionylamino)-benzene-2-sulfonic acid | 1-Amino-4-methoxybenzene-2-sulfonic acid ⟶ 2-methylamino-5-hydroxynaphthalene-7-sulfonic acid | scarlet |
| 9 | 1-Amino-5-(2,3-dibromopropionylamino)-benzene-2-sulfonic acid | 1-Amino-3-acetylaminobenzene-6-sulfonic acid ⟶ 1-benzoylamino-8-hydroxynaphthalene-3,6-disulfonic acid, hydrolysed | bluish red |
| 10 | 1-Amino-5-(2,3-dibromopropionylamino)-benzene-2-sulfonic acid | 1-Amino-4-acetylaminobenzene-2-sulfonic acid ⟶ 2-amino-8-hydroxynaphthalene-6-sulfonic acid, hydrolysed | bluish red |
| 11 | 1-Amino-5-(2,3-dibromopropionylamino)-benzene-2-sulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 12 | 1-Amino-5-(2,3-dibromopropionylamino)-benzene-2-sulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 13 | 1-Amino-5-(2,3-dibromopropionylamino)-benzene-2-sulfonic acid | N—(2-Hydroxy-3,5-disulfophenyl)-N'—(2'-carboxy-4'-aminophenyl)-ms-phenylformazan, Cu complex | blue |

TABLE 1-continued

| No. | Intermediate | Chromophore | Hue on cotton |
|---|---|---|---|
| 14 | 1-Amino-5-(2,3-dibromopropionylamino)-benzene-2-sulfonic acid | N—(2-Carboxy-5-sulfophenyl)-N'—(2'-hydroxy-3'-amino-5'-sulfophenyl)-ms-phenylformazan, Cu complex | blue |
| 15 | 1-Amino-5-(2,3-dibromopropionylamino)-benzene-2-sulfonic acid | ½ equivalent of [structure: H₂N—(CH₂)₃NH— attached to chromophore with SO₃H, Cl, N, O, Cl groups, linked to —NH—(CH₂)₃—NH₂ with SO₃H] | blue |
| 16 | 1-Amino-5-(2,3-dibromopropionylamino)-benzene-2-sulfonic acid | ½ equivalent of [structure: H₂N—(CH₂)₄—NH— attached to chromophore with SO₃H, Cl, N, O, Cl groups, linked to —NH—(CH₂)₄—NH₂ with SO₃H] | blue |
| 17 | 1-Amino-5-(2,3-dibromopropionylamino)-benzene-2-sulfonic acid | 0.8 equivalent of CuPc—(3)—(SO₃H / SO₂NH₂)₂,₆ —(SO₂NH—[phenyl with NH₂, SO₃H])₁,₃ | turquoise blue |

TABLE 1-continued

| No. | Intermediate | Chromophore | Hue on cotton |
|---|---|---|---|
| 18 | 1-Amino-5-(2,3-dibromopropionylamino)-benzene-2-sulfonic acid | ½ equivalent of CuPc—(4)(SO₃H / SO₂NH₂)~2,0 / (SO₂NH— [benzene with SO₃H and NH₂])~2,0 | turquoise blue |
| 19 | 1-Amino-5-(2,3-dichloropropionylamino)-benzene-2-sulfonic acid | 2-Aminonaphthalene-3,6,8-trisulfonic acid ⟶ 1-amino-3-acetylaminobenzene | reddish yellow |
| 20 | 1-Amino-5-(2,3-dichloropropionylamino)-benzene-2-sulfonic acid | 2-Aminonaphthalene-3,6,8-trisulfonic acid ⟶ 3-aminophenylurea | reddish yellow |
| 21 | 1-Amino-5-(2,3-dichloropropionylamino)-benzene-2-sulfonic acid | 1-Amino-3-acetylaminobenzene-6-sulfonic acid ⟶ 1-ethyl-3-sulfomethyl-4-methyl-6-hydroxypyrid-2-one-5-carboxamide, hydrolysed | yellow |
| 22 | 1-Amino-5-(2,3-dichloropropionylamino)-benzene-2-sulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 23 | 1-Amino-5-(2,3-dichloropropionylamino)-benzene-2-sulfonic acid | 2-Aminonaphthalene-1,5-disulfonic acid ⟶ 2-acetylamino-5-hydroxynaphthalene-7-sulfonic acid, hydrolysed | orange |
| 24 | 1-Amino-5-(2,3-dichloropropionylamino)-benzene-2-sulfonic acid | 2-Aminonaphthalene-3,6,8-trisulfonic acid ⟶ 2-acetylamino-5-hydroxynaphthalene-7-sulfonic acid, hydrolysed | orange |
| 25 | 1-Amino-5-(2,3-dichloropropionylamino)-benzene-2-sulfonic acid | 1-Amino-4-methoxybenzene-2-sulfonic acid ⟶ 2-amino-5-hydroxynaphthalene-7-sulfonic acid | scarlet |
| 26 | 1-Amino-5-(2,3-dichloropropionylamino)-benzene-2-sulfonic acid | 1-Amino-4-methoxybenzene-2-sulfonic acid ⟶ 2-methylamino-5-hydroxynaphthalene-7-sulfonic acid | scarlet |
| 27 | 1-Amino-5-(2,3-dichloropropionylamino)-benzene-2-sulfonic acid | 1-Amino-3-acetylaminobenzene-6-sulfonic acid ⟶ 1-benzoylamino-8-hydroxynaphthalene-3,6-disulfonic acid, hydrolysed | bluish red |

TABLE 1-continued

| No. | Intermediate | Chromophore | Hue on cotton |
|---|---|---|---|
| 28 | 1-Amino-5-(2,3-dichloro-propionylamino)-benzene-2-sulfonic acid | 1-Amino-4-acetylaminobenzene-2-sulfonic acid →acid 2-amino-8-hydroxynaphthalene-6-sulfonic acid, hydrolysed | bluish red |
| 29 | 1-Amino-5-(2,3-dichloro-propionylamino)-benzene-2-sulfonic acid | 1-Amino-3-acetylaminobenzene-6-sulfonic acid →1-amino-8-hydroxy-2-(4'-sulfophenylazo)-naphthalene-3,6-disulfonic acid, hydrolysed | blue |
| 30 | 1-Amino-5-(2,3-dichloro-propionylamino)-benzene-2-sulfonic acid | 1-Amino-3-acetylaminobenzene-6-sulfonic acid →1-amino-8-hydroxy-2-(2',5'-disulfophenylazo)-naphthalene-3,6-disulfonic acid, hydrolysed | blue |
| 31 | 1-Amino-5-(2,3-dichloro-propionylamino)-benzene-2-sulfonic acid | N—(2-Hydroxy-3,5-disulfophenyl)-N'—(2'-carboxy-4'-aminophenyl)-ms-phenylformazan, Cu complex | blue |
| 32 | 1-Amino-5-(2,3-dichloro-propionylamino)-benzene-2-sulfonic acid | N—(2-Carboxy-5-sulfophenyl)-N'—(2'-hydroxy-3'-amino-5'-sulfophenyl)-ms-phenylformazan, Cu complex | blue |
| 33 | 1-Amino-5-(2,3-dichloro-propionylamino)-benzene-2-sulfonic acid | ½ equivalent of 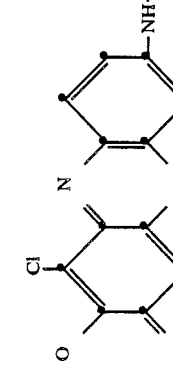 | blue |
| 34 | 1-Amino-5-(2,3-dichloro-propionylamino)-benzene-2-sulfonic acid | ½ equivalent of 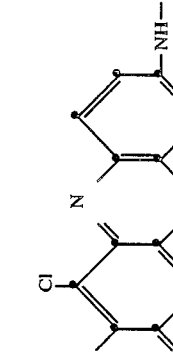 | blue |

TABLE 1-continued

| No. | Intermediate | Chromophore | Hue on cotton |
|---|---|---|---|
| 35 | 1-Amino-5-(2,3-dichloro-propionylamino)-benzene-2-sulfonic acid | 0.8 equivalent of CuPc—(3)(SO$_3$H / SO$_2$NH$_2$)$_{2,6}$ (SO$_2$NH–C$_6$H$_3$(NH$_2$)(SO$_3$H))$_{1,3}$ | turquoise blue |
| 36 | 1-Amino-5-(2,3-dichloro-propionylamino)-benzene-2-sulfonic acid | ½ equivalent of CuPc—(4)(SO$_3$H / SO$_2$NH$_2$)$_{\sim 2,0}$ (SO$_2$NH–C$_6$H$_3$(NH$_2$)(SO$_3$H))$_{\sim 2,0}$ | turquoise blue |
| 37 | 1-Amino-5-(4-(β-chloro-ethylsulfonyl)-butyryl-amino)-benzene-2-sulfonic acid | 2-Aminonaphthalene-3,6,8-trisulfonic acid ⟶ 1-amino-3-acetylaminobenzene | reddish yellow |
| 38 | 1-Amino-5-(4-(β-chloro-ethylsulfonyl)-butyryl-amino)-benzene-2-sulfonic acid | 2-Aminonaphthalene-3,6,8-trisulfonic acid ⟶ 3-aminophenylurea | reddish yellow |
| 39 | 1-Amino-5-(4-(β-chloro-ethylsulfonyl)-butyryl-amino)-benzene-2-sulfonic acid | 1-Amino-3-acetylaminobenzene-6-sulfonic acid ⟶ 1-ethyl-3-sulfomethyl-4-methyl-6-hydroxypyrid-2-one-5-carboxamide, hydrolysed | yellow |
| 40 | 1-Amino-5-(4-(β-chloro-ethylsulfonyl)-butyryl-amino)-benzene-2-sulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 41 | 1-Amino-5-(4-(β-chloro-ethylsulfonyl)-butyryl-amino)-benzene-2-sulfonic acid | 2-Aminonaphthalene-1,5-disulfonic acid ⟶ 2-acetylamino-5-hydroxynaphthalene-7-sulfonic acid, hydrolysed | orange |

TABLE 1-continued

| No. | Intermediate | Chromophore | Hue on cotton |
|---|---|---|---|
| 42 | 1-Amino-5-(4-(β-chloro-ethylsulfonyl)-butyryl-amino)-benzene-2-sulfonic acid | 2-Aminonaphthalene-3,6,8-trisulfonic acid ⟶ 2-acetylamino-5-hydroxynaphthalene-7-sulfonic acid, hydrolysed | orange |
| 43 | 1-Amino-5-(4-(β-chloro-ethylsulfonyl)-butyryl-amino)-benzene-2-sulfonic acid | 1-Amino-4-methoxybenzene-2-sulfonic acid ⟶ 2-amino-5-hydroxynaphthalene-7-sulfonic acid | scarlet |
| 44 | 1-Amino-5-(4-(β-chloro-ethylsulfonyl)-butyryl-amino)-benzene-2-sulfonic acid | 1-Amino-4-methoxybenzene-2-sulfonic acid ⟶ 2-methylamino-5-hydroxynaphthalene-7-sulfonic acid | scarlet |
| 45 | 1-Amino-5-(4-(β-chloro-ethylsulfonyl)-butyryl-amino)-benzene-2-sulfonic acid | 1-Amino-3-acetylaminobenzene-6-sulfonic acid ⟶ 1-benzoylamino-8-hydroxynaphthalene-3,6-disulfonic acid, hydrolysed | bluish red |
| 46 | 1-Amino-5-(4-(β-chloro-ethylsulfonyl)-butyryl-amino)-benzene-2-sulfonic acid | 1-Amino-4-acetylaminobenzene-2-sulfonic acid ⟶ 2-amino-8-hydroxynaphthalene-6-sulfonic acid, hydrolysed | bluish red |
| 47 | 1-Amino-5-(4-(β-chloro-ethylsulfonyl)-butyryl-amino)-benzene-2-sulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 48 | 1-Amino-5-(4-(β-chloro-ethylsulfonyl)-butyryl-amino)-benzene-2-sulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 49 | 1-Amino-5-(4-(β-chloro-ethylsulfonyl)-butyryl-amino)-benzene-2-sulfonic acid | N—(2-Hydroxy-3,5-disulfophenyl)-N'—(2'-carboxy-4'aminophenyl)-ms-phenylformazan, Cu comlex | blue |
| 50 | 1-Amino-5-(4-(β-chloro-ethylsulfonyl)-butyryl-amino)-benzene-2-sulfonic acid | N—(2-Carboxy-5-sulfophenyl)-N'—(2'-hydroxy-3'-amino-5'-sulfophenyl)-ms-phgenylformazan, Cu complex | blue |

TABLE 1-continued

| No. | Intermediate | Chromophore | Hue on cotton |
|---|---|---|---|
| 51 | 1-Amino-5-(4-(β-chloroethyl)-sulfonyl)-butyrylamino)-benzene-2-sulfonic acid | ½ equivalent of [dichloroquinoxaline bis-amide structure with H$_2$N—(CH$_2$)$_3$—NH and NH—(CH$_2$)$_3$—NH$_2$ linkers, SO$_3$H groups] | blue |
| 52 | 1-Amino-5-(4-(β-chloroethyl)-sulfonyl)-butyrylamino)-benzene-2-sulfonic acid | ½ equivalent of [dichloroquinoxaline bis-amide structure with H$_2$N—(CH$_2$)$_4$—NH and NH—(CH$_2$)$_4$—NH$_2$ linkers, SO$_3$H groups] | blue |
| 53 | 1-Amino-5-(4-(β-chloroethyl)-sulfonyl)-butyrylamino)-benzene-2-sulfonic acid | 0.8 equivalent of CuPc—(SO$_3$H)(SO$_2$NH$_2$)$_{2,6}$—(SO$_2$NH—[phenyl with NH$_2$, SO$_3$H])$_{1,3}$ | turquoise blue |
| 54 | 1-Amino-5-(4-(β-chloroethyl)-sulfonyl)-butyrylamino)-benzene-2-sulfonic acid | ½ equivalent of CuPc—(SO$_3$H)(SO$_2$NH$_2$)$_{\sim 2,0}$—(SO$_2$NH—[phenyl with NH$_2$, SO$_3$H])$_{\sim 2,0}$ | turquoise blue |

TABLE 1-continued

| No. | Intermediate | Chromophore | | Hue on cotton |
|---|---|---|---|---|
| 55 | 1-Amino-5-(2',4'-dichloro-pyrimidine-5'-carbonylamino)-benzene-2-sulfonic acid | 2-Aminonaphthalene-3,6,8-trisulfonic acid → 1-amino-3-acetylaminobenzene | | reddish yellow |
| 56 | 1-Amino-5-(2',4'-dichloro-pyrimidine-5'-carbonylamino)-benzene-2-sulfonic acid | 2-Aminonaphthalene-3,6,8-trisulfonic acid → 3-aminophenylurea | | reddish yellow |
| 57 | 1-Amino-5-(2',4'-dichloro-pyrimidine-5'-carbonylamino)-benzene-2-sulfonic acid | 1-Amino-3-acetylaminobenzene-6-sulfonic acid → 1-ethyl-3-sulfomethyl-4-methyl-6-hydroxypyrid-2-one-5-carboxylic acid, hydrolysed | | yellow |
| 58 | 1-Amino-5-(2',4'-dichloro-pyrimidine-5'-carbonylamino)-benzene-2-sulfonic acid | 1-Amino-3-acetylaminobenzene-6-sulfonic acid → 1-ethyl-3-aminocarbonyl-4-methyl-6-hydroxypyrid-2-one, hydrolysed | | yellow |
| 59 | 1-Amino-5-(2',4'-dichloro-pyrimidine-5'-carbonylamino)-benzene-2-sulfonic acid | 2-Aminonaphthalene-1,5-disulfonic acid → 2-acetylamino-5-hydroxynaphthalene-7-sulfonic acid, hydrolysed | | orange |
| 60 | 1-Amino-5-(2',4'-dichloro-pyrimidine-5'-carbonylamino)-benzene-2-sulfonic acid | 2-Aminonaphthalene-3,6,8-trisulfonic acid → 2-acetylamino-5-hydroxynaphthalene-7-sulfonic acid, hydrolysed | | orange |
| 61 | 1-Amino-5-(2',4'-dichloro-pyrimidine-5'-carbonylamino)-benzene-2-sulfonic acid | 1-Amino-4-methoxybenzene-2-sulfonic acid → 2-amino-5-hydroxynaphthalene-7-sulfonic acid, hydrolysed | | scarlet |
| 62 | 1-Amino-5-(2',4'-dichloro-pyrimidine-5'-carbonylamino)-benzene-2-sulfonic acid | 1-Amino-4-methoxybenzene-2-sulfonic acid → 2-methylamino-5-hydroxynaphthalene-7-sulfonic acid | | scarlet |
| 63 | 1-Amino-5-(2',4'-dichloro-pyrimidine-5'-carbonylamino)-benzene-2-sulfonic acid | 1-Amino-3-acetylaminobenzene-6-sulfonic acid → 1-benzoylamino-8-hydroxynaphthalene-3,6-disulfonic acid, hydrolysed | | bluish red |
| 64 | 1-Amino-5-(2',4'-dichloro-pyrimidine-5'-carbonylamino)-benzene-2-sulfonic acid | 1-Amino-4-acetylaminobenzene-2-sulfonic acid → 2-amino-8-hydroxynaphthalene-6-sulfonic acid, hydrolysed | | bluish red |
| 65 | 1-Amino-5-(2',4'-dichloro-pyrimidine-5'-carbonylamino)-benzene-2-sulfonic acid | 1-Amino-3-acetylaminobenzene-6-sulfonic acid → 1-amino-8-hydroxy-2-(4'-sulfophenylazo)-naphthalene-3,6-disulfonic acid, hydrolysed | | blue |
| 66 | 1-Amino-5-(2',4'-dichloro-pyrimidine-5'-carbonylamino)-benzene-2-sulfonic acid | 1-Amino-3-acetylaminobenzene-6-sulfonic acid → 1-amino-8-hydroxy-2-(2',5'-disulfophenylazo)-naphthalene-3,6-disulfonic acid, hydrolysed | | blue |
| 67 | 1-Amino-5-(2',4'-dichloro-pyrimidine-5'-carbonylamino)-benzene-2-sulfonic acid | N—(2-Hydroxy-3,5-disulfophenyl)-N'—(2'-carboxy-4'-aminophenyl)-ms-phenylformazan, Cu complex | | blue |

TABLE 1-continued

| No. | Intermediate | Chromophore | Hue on cotton |
|---|---|---|---|
| | benzene-2-sulfonic acid | | |
| 68 | 1-Amino-5-(2',4'-dichloro-pyrimidine-5'-carbonylamino)-benzene-2-sulfonic acid | N—(2-Carboxy-5-sulfophenyl)-N'—(2'-hydroxy-3'-amino-5'-sulfophenyl)-ms-phenylformazan, Cu complex | blue |
| 69 | 1-Amino-5-(2',4'-dichloro-pyrimidine-5'-carbonylamino)-benzene-2-sulfonic acid | ½ equivalent of H$_2$N—(CH$_2$)$_3$—NH— [structure with dichloropyrimidine and sulfophenyl with NH—(CH$_2$)$_3$—NH$_2$ and SO$_3$H groups] | blue |
| 70 | 1-Amino-5-(2',4'-dichloro-pyrimidine-5'-carbonylamino)-benzene-2-sulfonic acid | ½ equivalent of H$_2$N—(CH$_2$)$_4$—NH— [structure with dichloropyrimidine and sulfophenyl with NH—(CH$_2$)$_4$—NH$_2$ and SO$_3$H groups] | blue |
| 71 | 1-Amino-5-(2',4'-dichloro-pyrimidine-5'-carbonylamino)-benzene-2-sulfonic acid | 0.8 equivalent of CuPc—(3)—[{SO$_3$H / SO$_2$NH$_2$}$_{2,6}$][{SO$_2$NH—phenyl(NH$_2$)(SO$_3$H)}$_{1,3}$] | turquoise blue |

TABLE 1-continued

| No. | Intermediate | Chromophore | Hue on cotton |
|---|---|---|---|
| 72 | 1-Amino-5-(2',4'-dichloro-pyrimidine-5'-carbonylamino)-benzene-2-sulfonic acid | ½ equivalent of CuPc—(4) {SO₃H, SO₂NH₂}~2,0 {SO₂NH— (benzene ring with SO₃H and NH₂)}~2,0 | turquoise blue |
| 73 | 1-Amino-5-(2',4'-dichloro-pyrimidine-6'-carbonylamino)-benzene-2-sulfonic acid | 2-Aminonaphthalene-3,6,8-trisulfonic acid ⟶ 1-amino-3-acetylaminobenzene | reddish yellow |
| 74 | 1-Amino-5-(2',4'-dichloro-pyrimidine-6'-carbonylamino)-benzene-2-sulfonic acid | 2-Aminonaphthalene-3,6,8-trisulfonic acid ⟶ 3-aminophenylurea | reddish yellow |
| 75 | 1-Amino-5-(2',4'-dichloro-pyrimidine-6'-carbonylamino)-benzene-2-sulfonic acid | 1-Amino-3-acetylaminobenzene-6-sulfonic acid ⟶ 1-ethyl-3-sulfomethyl-4-methyl-6-hydroxypyrid-2-one-5-carboxamide, hydrolysed | yellow |
| 76 | 1-Amino-5-(2',4'-dichloro-pyrimidine-6'-carbonylamino)-benzene-2-sulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 77 | 1-Amino-5-(2',4'-dichloro-pyrimidine-6'-carbonylamino)-benzene-2-sulfonic acid | 2-Aminonaphthalene-1,5-disulfonic acid ⟶ 2-acetylamino-5-hydroxynaphthalene-7-sulfonic acid, hydrolysed | orange |
| 78 | 1-Amino-5-(2',4'-dichloro-pyrimidine-6'-carbonylamino)-benzene-2-sulfonic acid | 2-Aminonaphthalene-3,6,8-trisulfonic acid ⟶ 2-acetylamino-5-hydroxynaphthalene-7-sulfonic acid, hydrolysed | orange |
| 79 | 1-Amino-5-(2',4'-dichloro-pyrimidine-6'-carbonylamino)-benzene-2-sulfonic acid | 1-Amino-4-methoxybenzene-2-sulfonic acid ⟶ 2-amino-5-hydroxynaphthalene-7-sulfonic acid | scarlet |
| 80 | 1-Amino-5-(2',4'-dichloro-pyrimidine-6'-carbonylamino)-benzene-2-sulfonic acid | 1-Amino-4-methoxybenzene-2-sulfonic acid ⟶ 2-methylamino-5-hydroxynaphthalene-7-sulfonic acid | scarlet |
| 81 | 1-Amino-5-(2',4'-dichloro-pyrimidine-6'-carbonylamino)-benzene-2-sulfonic acid | 1-Amino-3-acetylaminobenzene-6-sulfonic acid ⟶ 1-benzoylamino-8-hydroxynaphthalene-3,6-disulfonic acid, hydrolysed | bluish red |

TABLE 1-continued

| No. | Intermediate | Chromophore | Hue on cotton |
|---|---|---|---|
| 82 | 1-Amino-5-(2',4'-dichloro-pyrimidine-6'-carbonylamino)-benzene-2-sulfonic acid | 1-Amino-4-acetylaminobenzene-2-sulfonic acid ⟶ acid 2-amino-8-hydroxynaphthalene-6-sulfonic acid, hydrolysed | bluish red |
| 83 | 1-Amino-5-(2',4'-dichloro-pyrimidine-6'-carbonylamino)-benzene-2-sulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 84 | 1-Amino-5-(2',4'-dichloro-pyrimidine-6'-carbonylamino)-benzene-2-sulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 85 | 1-Amino-5-(2',4'-dichloro-pyrimidine-6'-carbonylamino)-benzene-2-sulfonic acid | N—(2-Hydroxy-3,5-disulfophenyl)-N'—(2'-carboxy-4'-aminophenyl)-ms-phenylformazan, Cu complex | blue |
| 86 | 1-Amino-5-(2',4'-dichloro-pyrimidine-6'-carbonylamino)-benzene-2-sulfonic acid | N—(2-Carboxy-5-sulfophenyl)-N'—(2'-hydroxy-3'-amino-5'-sulfophenyl)-ms-phenylformazan, Cu complex | blue |
| 87 | 1-Amino-5-(2',4'-dichloro-pyrimidine-6'-carbonylamino)-benzene-2-sulfonic acid | ½ equivalent of 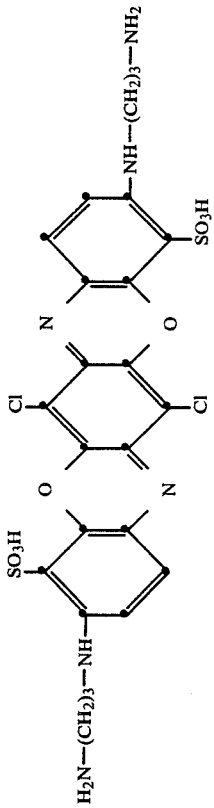 | blue |
| 88 | 1-Amino-5-(2',4'-dichloro-pyrimidine-6'-carbonylamino)-benzene-2-sulfonic acid | ½ equivalent of 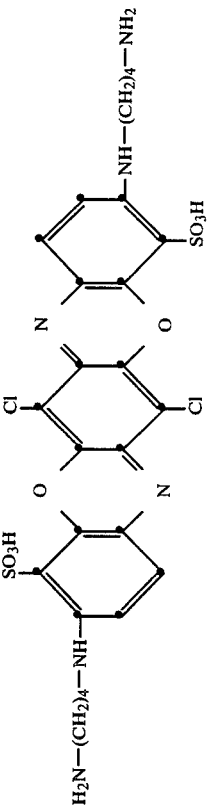 | blue |
| 89 | 1-Amino-5-(2',4'-dichloro- | 0.8 equivalent of | turquoise blue |

TABLE 1-continued

| No. | Intermediate | Chromophore | Hue on cotton |
|---|---|---|---|
| | pyrimidine-6'-carbonyl-amino)-benzene-2-sulfonic acid | | |
| 90 | 1-Amino-5-(2',4'-dichloro-pyrimidine-6'-carbonyl-amino)-benzene-2-sulfonic acid | ½ equivalent of  | turquoise blue |
| 91 | 1-Amino-5-(2',3'-dichloro-quinoxaline-6'-carbonyl-amino)-benzene-2-sulfonic acid | 2-Aminonaphthalene-3,6,8-trisulfonic acid → 1-amino-3-acetylaminobenzene | reddish yellow |
| 92 | 1-Amino-5-(2',3'-dichloro-quinoxaline-6'-carbonyl-amino)-benzene-2-sulfonic acid | 2-Aminonaphthalene-3,6,8-trisulfonic acid → 3-aminophenylurea | reddish yellow |
| 93 | 1-Amino-5-(2',3'-dichloro-quinoxaline-6'-carbonyl-amino)-benzene-2-sulfonic acid | 1-Amino-3-acetylaminobenzene-6-sulfonic acid → 1-ethyl-3-sulfomethyl-4-methyl-6-hydroxypyrid-2-one-5-carboxamide, hydrolysed | yellow |
| 94 | 1-Amino-5-(2',3'-dichloro-quinoxaline-6'-carbonyl-amino)-benzene-2-sulfonic acid | 1-Amino-3-acetylaminobenzene-6-sulfonic acid → 1-ethyl-3-aminocarbonyl-4-methyl-6-hydroxypyrid-2-one, hydrolysed | yellow |
| 95 | 1-Amino-5-(2',3'-dichloro-quinoxaline-6'-carbonyl-amino)-benzene-2-sulfonic acid | 2-Aminonaphthalene-1,5-disulfonic acid → 2-acetylamino-5-hydroxynaphthalene-7-sulfonic acid, hydrolysed | orange |

TABLE 1-continued

| No. | Intermediate | Chromophore | Hue on cotton |
|---|---|---|---|
| 96 | 1'-Amino-5-(2',3'-dichloro-quinoxaline-6'-carbonyl-amino)-benzene-2-sulfonic acid | 2-Aminonaphthalene-3,6,8-trisulfonic acid ⟶ 2-acetylamino-5-hydroxynaphthalene-7-sulfonic acid, hydrolysed | orange |
| 97 | 1'-Amino-5-(2',3'-dichloro-quinoxaline-6'-carbonyl-amino)-benzene-2-sulfonic acid | 1-Amino-4-methoxybenzene-2-sulfonic acid ⟶ 2-amino-5-hydroxynaphthalene-7-sulfonic acid | scarlet |
| 98 | 1'-Amino-5-(2',3'-dichloro-quinoxaline-6'-carbonyl-amino)-benzene-2-sulfonic acid | 1-Amino-4-methoxybenzene-2-sulfonic acid ⟶ 2-methylamino-5-hydroxynaphthalene-7-sulfonic acid | scarlet |
| 99 | 1'-Amino-5-(2',3'-dichloro-quinoxaline-6'-carbonyl-amino)-benzene-2-sulfonic acid | 1-Amino-4-acetylaminobenzene-6-sulfonic acid ⟶ 1-benzoylamino-8-hydroxynaphthalene-3,6-disulfonic acid, hydrolysed | bluish red |
| 100 | 1'-Amino-5-(2',3'-dichloro-quinoxaline-6'-carbonyl-amino)-benzene-2-sulfonic acid | 1-Amino-4-acetylaminobenzene-2-sulfonic acid ⟶ acid 2-amino-8-hydroxynaphthalene-6-sulfonic acid, hydrolysed | bluish red |
| 101 | 1'-Amino-5-(2',3'-dichloro-quinoxaline-6'-carbonyl-amino)-benzene-2-sulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 102 | 1'-Amino-5-(2',3'-dichloro-quinoxaline-6'-carbonyl-amino)-benzene-2-sulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 103 | 1'-Amino-5-(2',3'-dichloro-quinoxaline-6'-carbonyl-amino)-benzene-2-sulfonic acid | N—(2-Hydroxy-3,5-disulfophenyl)-N'—(2'-carboxy-4'-aminophenyl)-ms-phenylformazan, Cu complex | blue |
| 104 | 1'-Amino-5-(2',3'-dichloro-quinoxaline-6'-carbonyl-amino)-benzene-2-sulfonic acid | N—(2-Carboxy-5-sulfophenyl)-N'—(2'-hydroxy-3'-amino-5'-sulfophenyl)-ms-phenylformazan, Cu complex | blue |
| 105 | 1-Amino-5-(2',3'-dichloro- | ½ equivalent of | blue |

TABLE 1-continued

| No. | Intermediate | Chromophore | Hue on cotton |
|---|---|---|---|
| 106 | 1-Amino-5-(2',3'-dichloro-quinoxaline-6'-carbonyl-amino)-benzene-2-sulfonic acid | ½ equivalent of [structure: H₂N—(CH₂)₃—NH—[dichloroquinoxaline-carbonyl]—NH—(CH₂)₃—NH₂ with SO₃H groups] | blue |
| 107 | 1-Amino-5-(2',3'-dichloro-quinoxaline-6'-carbonyl-amino)-benzene-2-sulfonic acid | ½ equivalent of [structure: H₂N—(CH₂)₄—NH—[dichloroquinoxaline-carbonyl]—NH—(CH₂)₄—NH₂ with SO₃H groups] | turquoise blue |
| 108 | 1-Amino-5-(2',3'-dichloro-quinoxaline-6'-carbonyl-amino)-benzene-2-sulfonic acid | 0.8 equivalent of CuPc—(3)[(SO₃H/SO₂NH₂)₂.₆][(SO₂NH—aryl(NH₂)(SO₃H))₁.₃] | turquoise blue |
| | | ½ equivalent of CuPc—(4)[(SO₃H/SO₂NH₂)~₂.₀][(SO₂NH—aryl(SO₃H)(NH₂))~₂.₀] | turquoise blue |

TABLE 1-continued

| No. | Intermediate | Chromophore | Hue on cotton |
|-----|--------------|-------------|---------------|
| 109 | 1-Amino-5-(α-bromoacryloylamino)-benzene-2-sulfonic acid | 2-Aminonaphthalene-3,6,8-trisulfonic acid ⟶ 1-amino-3-acetylaminobenzene | reddish yellow |
| 110 | 1-Amino-5-(α-bromoacryloylamino)-benzene-2-sulfonic acid | 2-Aminonaphthalene-3,6,8-trisulfonic acid ⟶ 3-aminophenylurea | reddish yellow |
| 111 | 1-Amino-5-(α-bromoacryloylamino)-benzene-2-sulfonic acid | 1-Amino-3-acetylaminobenzene-6-sulfonic acid ⟶ 1-ethyl-3-sulfomethyl-4-methyl-6-hydroxypyrid-2-one-carboxamide, hydrolysed | yellow |
| 112 | 1-Amino-5-(α-bromoacryloylamino)-benzene-2-sulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 113 | 1-Amino-5-(α-bromoacryloylamino)-benzene-2-sulfonic acid | 2-Aminonaphthalene-1,5-disulfonic acid ⟶ 2-acetylamino-5-hydroxynaphthalene-7-sulfonic acid, hydrolysed | orange |
| 114 | 1-Amino-5-(α-bromoacryloylamino)-benzene-2-sulfonic acid | 2-Aminonaphthalene-3,6,8-trisulfonic acid ⟶ 2-acetylamino-5-hydroxynaphthalene-7-sulfonic acid, hydrolysed | orange |
| 115 | 1-Amino-5-(α-bromoacryloylamino)-benzene-2-sulfonic acid | 1-Amino-4-mexthoxybenzene-2-sulfonic acid ⟶ 2-amino-5-hydroxynaphthalene-7-sulfonic acid | scarlet |
| 116 | 1-Amino-5-(α-bromoacryloylamino)-benzene-2-sulfonic acid | 1-Amino-4-mexthoxybenzene-2-sulfonic acid ⟶ 2-methylamino-5-hydroxynaphthalene-7-sulfonic acid | scarlet |
| 117 | 1-Amino-5-(α-bromoacryloylamino)-benzene-2-sulfonic acid | 1-Amino-3-acetylaminobenzene-6-sulfonic acid ⟶ 1-benzoylamino-8-hydroxynaphthalene-3,6-disulfonic acid, hydrolysed | bluish red |
| 118 | 1-Amino-5-(α-bromoacryloylamino)-benzene-2-sulfonic acid | 1-Amino-4-acetylaminobenzene-2-sulfonic acid 2-amino-8-hydroxynaphthalene-6-sulfonic acid, hydrolysed | bluish red |
| 119 | 1-Amino-5-(α-bromoacryloylamino)-benzene-2-sulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 120 | 1-Amino-5-(α-bromoacryloylamino)-benzene-2-sulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 121 | 1-Amino-5-(α-bromoacryloylamino)-benzene-2-sulfonic acid | N—(2-Hydroxy-3,5-disulfophenyl)-N'—(2'-carboxy-4'-aminophenyl)-ms-phenylformazan, Cu complex | blue |

TABLE 1-continued

| No. | Intermediate | Chromophore | Hue on cotton |
|---|---|---|---|
| 122 | 1-Amino-5-(α-bromoacryloylamino)-benzene-2-sulfonic acid | N—(2-Carboxy-5-sulfophenyl)-N'—(2'-hydroxy-3'-amino-5'-sulfophenyl)-ms-phenylformazan, Cu complex | blue |
| 123 | 1-Amino-5-(α-bromoacryloylamino)-benzene-2-sulfonic acid | ½ equivalent of [structure with H₂N—(CH₂)₃—NH and NH—(CH₂)₃—NH₂ linked via dichlorotriazine-dioxy-bisphenyl-SO₃H] | blue |
| 124 | 1-Amino-5-(α-bromoacryloylamino)-benzene-2-sulfonic acid | ½ equivalent of [structure with H₂N—(CH₂)₄—NH and NH—(CH₂)₄—NH₂ linked via dichlorotriazine-dioxy-bisphenyl-SO₃H] | blue |
| 125 | 1-Amino-5-(α-bromoacryloylamino)-benzene-2-sulfonic acid | 0.8 equivalent of CuPc—(3)[(SO₃H)(SO₂NH₂)]₂,₆[SO₂NH—phenyl(NH₂)(SO₃H)]₁,₃ | turquoise blue |

TABLE 1-continued

| No. | Intermediate | Chromophore | Hue on cotton |
|---|---|---|---|
| 126 | 1-Amino-5-(α-bromoacryloylamino)-benzene-2-sulfonic acid | ½ equivalent of CuPc—(4)[(SO₃H)(SO₂NH₂)]~2,0 [(SO₂NH–⟨benzene with SO₃H and NH₂⟩)]~2,0 | turquoise blue |
| 127 | 1-Amino-4-(2,3-dibromopropionylamino)-benzene-2,5-disulfonic acid | 2-Aminonaphthalene-3,6,8-trisulfonic acid ⟶ 1-amino-3-acetylaminobenzene | reddish yellow |
| 128 | 1-Amino-4-(2,3-dibromopropionylamino)-benzene-2,5-disulfonic acid | 2-Aminonaphthalene-3,6,8-trisulfonic acid ⟶ 3-Aminophenylurea | reddish yellow |
| 129 | 1-Amino-4-(2,3-dibromopropionylamino)-benzene-2,5-disulfonic acid | 1-Amino-3-acetylaminobenzene-6-sulfonic acid ⟶ 1-ethyl-3-sulfomethyl-4-methyl-6-hydroxypyrid-2-one-5-carboxamide, hydrolysed | yellow |
| 130 | 1-Amino-4-(2,3-dibromopropionylamino)-benzene-2,5-disulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 131 | 1-Amino-4-(2,3-dibromopropionylamino)-benzene-2,5-disulfonic acid | 2-Aminonaphthalene-1,5-disulfonic acid ⟶ 2-acetylamino-5-hydroxynaphthalene-7-sulfonic acid, hydrolysed | orange |
| 132 | 1-Amino-4-(2,3-dibromopropionylamino)-benzene-2,5-disulfonic acid | 2-Aminonaphthalene-3,6,8-trisulfonic acid ⟶ 2-acetylamino-5-hydroxynaphthalene-7-sulfonic acid, hydrolysed | orange |
| 133 | 1-Amino-4-(2,3-dibromopropionylamino)-benzene-2,5-disulfonic acid | 1-Amino-4-methoxybenzene-2-sulfonic acid ⟶ 2-amino-5-hydroxynaphthalene-7-sulfonic acid | scarlet |
| 134 | 1-Amino-4-(2,3-dibromopropionylamino)-benzene-2,5-disulfonic acid | 1-Amino-4-methoxybenzene-2-sulfonic acid ⟶ 2-methylamino-5-hydroxynaphthalene-7-sulfonic acid | scarlet |
| 135 | 1-Amino-4-(2,3-dibromopropionylamino)-benzene-2,5-disulfonic acid | 1-Amino-3-acetylaminobenzene-6-sulfonic acid ⟶ 1-benzoylamino-8-hydroxynaphthalene-3,6-disulfonic acid, hydrolysed | bluish red |

TABLE 1-continued

| No. | Intermediate | Chromophore | Hue on cotton |
|---|---|---|---|
| 136 | 1-Amino-4-(2,3-dibromo-propionylamino)-benzene-2,5-disulfonic acid | 1-Amino-4-acetylaminobenzene-2-sulfonic acid ⟶ acid 2-amino-8-hydroxynaphthalene-6-sulfonic acid, hydrolysed | bluish red |
| 137 | 1-Amino-4-(2,3-dibromo-propionylamino)-benzene-2,5-disulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 138 | 1-Amino-4-(2,3-dibromo-propionylamino)-benzene-2,5-disulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 139 | 1-Amino-4-(2,3-dibromo-propionylamino)-benzene-2,5-disulfonic acid | N—(2-Hydroxy-3,5-disulfophenyl)-N'—(2'-carboxy-4'-aminophenyl)-ms-phenylformazan, Cu complex | blue |
| 140 | 1-Amino-4-(2,3-dibromo-propionylamino)-benzene-2,5-disulfonic acid | N—(2-Carboxy-4-sulfophenyl)-N'—(2'-hydroxy-3'-amino-5'-sulfophenyl)-ms-phenylformazan, Cu complex | blue |
| 141 | 1-Amino-4-(2,3-dibromo-propionylamino)-benzene-2,5-disulfonic acid | ½ equivalent of 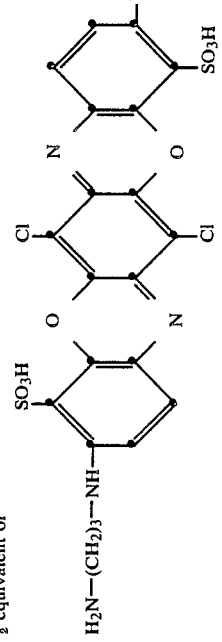 | blue |
| 142 | 1-Amino-4-(2,3-dibromo-propionylamino)-benzene-2,5-disulfonic acid | ½ equivalent of 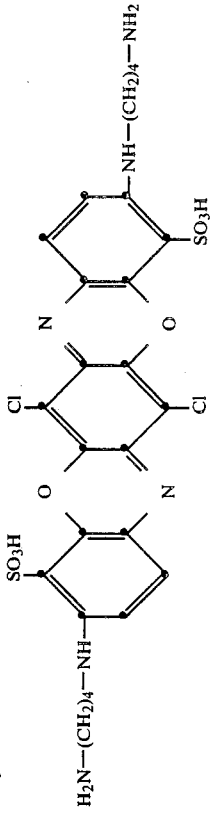 | blue |

TABLE 1-continued

| No. | Intermediate | Chromophore | Hue on cotton |
|---|---|---|---|
| 143 | 1-Amino-4-(2,3-dibromo-propionylamino)-benzene-2,5-disulfonic acid | 0.8 equivalent of CuPc—(3)—(SO₃H)/(SO₂NH₂)₂,₆ ; —SO₂NH—(aminobenzenesulfonic acid moiety with NH₂ and SO₃H)₁,₃ | turquoise blue |
| 144 | 1-Amino-4-(2,3-dibromo-propionylamino)-benzene-2,5-disulfonic acid | ½ equivalent of CuPc—(4)—(SO₃H)/(SO₂NH₂)~2,0 ; —SO₂NH—(aminobenzenesulfonic acid moiety with NH₂ and SO₃H)~2,0 | turquoise blue |
| 145 | 1-Amino-4-(α-bromo-acryloylamino)-benzene-2,5-disulfonic acid | 2-Aminonaphthalene-3,6,8-trisulfonic acid ⟶ 1-amino-3-acetylaminobenzene | reddish yellow |
| 146 | 1-Amino-4-(α-bromo-acryloylamino)-benzene-2,5-disulfonic acid | 2-Aminonaphthalene-3,6,8-trisulfonic acid ⟶ 3-aminophenylurea | reddish yellow |
| 147 | 1-Amino-4-(α-bromo-acryloylamino)-benzene-2,5-disulfonic acid | 1-Amino-3-acetylaminobenzene-6-sulfonic acid ⟶ 1-ethyl-3-sulfomethyl-4-methyl-6-hydroxypyrid-2-one-5-carboxamide, hydrolysed | yellow |
| 148 | 1-Amino-4-(α-bromo-acryloylamino)-benzene-2,5-disulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 149 | 1-Amino-4-(α-bromo-acryloylamino)-benzene-2,5-disulfonic acid | 2-Aminonaphthalene-1,5-disulfonic acid ⟶ 2-acetylamino-5-hydroxynaphthalene-7-sulfonic acid, hydrolysed | orange |
| 150 | 1-Amino-4-(α-bromo-acryloylamino)-benzene-2,5-disulfonic acid | 2-Aminonaphthalene-3,6,8-trisulfonic acid ⟶ 2-acetylamino-5-hydroxynaphthalene-7-sulfonic acid, hydrolysed | orange |

TABLE 1-continued

| No. | Intermediate | Chromophore | Hue on cotton |
|---|---|---|---|
| 151 | 1-Amino-4-(α-bromo-acryloylamino)-benzene-2,5-disulfonic acid | 1-Amino-4-methoxybenzene-2-sulfonic acid ⟶ 2-amino-5-hydroxynaphthalene-7-sulfonic acid | scarlet |
| 152 | 1-Amino-4-(α-bromo-acryloylamino)-benzene-2,5-disulfonic acid | 1-Amino-4-methoxybenzene-2-sulfonic acid ⟶ 2-methylamino-5-hydroxynaphthalene-7-sulfonic acid | scarlet |
| 153 | 1-Amino-4-(α-bromo-acryloylamino)-benzene-2,5-disulfonic acid | 1-Amino-3-acetylaminobenzene-6-sulfonic acid ⟶ 1-benzoylamino-8-hydroxynaphthalene-3,6-disulfonic acid, hydrolysed | bluish red |
| 154 | 1-Amino-4-(α-bromo-acryloylamino)-benzene-2,5-disulfonic acid | 1-Amino-4-acetylaminobenzene-2-sulfonic acid ⟶ acid 2-amino-8-hydroxynaphthalene-6-sulfonic acid, hydrolysed | bluish red |
| 155 | 1-Amino-4-(α-bromo-acryloylamino)-benzene-2,5-disulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 156 | 1-Amino-4-(α-bromo-acryloylamino)-benzene-2,5-disulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 157 | 1-Amino-4-(α-bromo-acryloylamino)-benzene-2,5-disulfonic acid | N—(2-Hydroxy-3,5-disulfophenyl)-N'—(2'-carboxy-4'-aminophenyl)-ms-phenylformazan, Cu complex | blue |
| 158 | 1-Amino-4-(α-bromo-acryloylamino)-benzene-2,5-disulfonic acid | N—(2-Carboxy-5-sulfophenyl)-N'—(2'-hydroxy-3'-amino-5'-sulfophenyl)-ms-phenylformazan, Cu complex | blue |
| 159 | 1-Amino-4-(α-bromo-acryloylamino)-benzene-2,5-disulfonic acid | ½ equivalent of 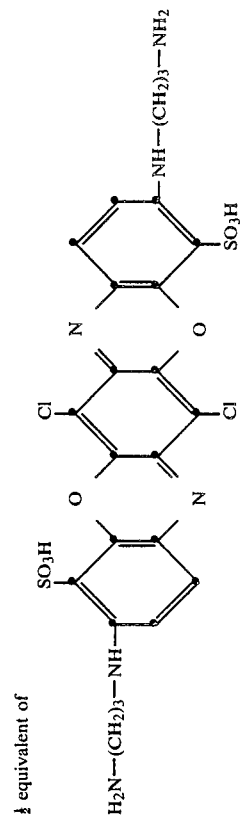 | blue |

TABLE 1-continued

| No. | Intermediate | Chromophore | Hue on cotton |
|---|---|---|---|
| 160 | 1-Amino-4-(α-bromo-acryloylamino)-benzene-2,5-disulfonic acid | ½ equivalent of [structure: H₂N—(CH₂)₄—NH— linked to triazine (Cl, Cl) linked to —NH—(CH₂)₄—NH₂ with SO₃H groups on two benzene rings] | blue |
| 161 | 1-Amino-4-(α-bromo-acryloylamino)-benzene-2,5-disulfonic acid | 0.8 equivalent of CuPc—(3)—(SO₃H / SO₂NH₂)₂,₆ (SO₂NH—[benzene with NH₂, SO₃H])₁,₃ | turquoise blue |
| 162 | 1-Amino-4-(α-bromo-acryloylamino)-benzene-2,5-disulfonic acid | ½ equivalent of CuPc—(4)—(SO₃H / SO₂NH₂)~2,0 (SO₂NH—[benzene with NH₂, SO₃H])~2,0 | turquoise blue |
| 163 | 1-Amino-4-(4-(β-chloro-ethylsulfonyl)-butyryl-amino)-benzene-2,5-disulfonic acid | 2-Aminonaphthalene-3,6,8-trisulfonic acid ⟶ 1-amino-3-acetylaminobenzene | reddish yellow |
| 164 | 1-Amino-4-(4-(β-chloro-ethylsulfonyl)-butyryl-amino)-benzene-2,5-disulfonic acid | 2-Aminonaphthalene-3,6,8-trisulfonic acid ⟶ 3-aminophenylurea | reddish yellow |

TABLE 1-continued

| No. | Intermediate | Chromophore | Hue on cotton |
|---|---|---|---|
| 165 | 1-Amino-4-(4-(β-chloro-ethylsulfonyl)-butyryl-amino)-benzene-2,5-disulfonic acid | 1-Amino-3-acetylaminobenzene-6-sulfonic acid → 1-ethyl-3-sulfomethyl-4-methyl-6-hydroxypyrid-2-one-5-carboxamide, hydrolysed | yellow |
| 166 | 1-Amino-4-(4-(β-chloro-ethylsulfonyl)-butyryl-amino)-benzene-2,5-disulfonic acid | 1-Amino-3-acetylaminobenzene-6-sulfonic acid → 1-ethyl-3-aminocarbonyl-4-methyl-6-hydroxypyrid-2-one, hydrolysed | yellow |
| 167 | 1-Amino-4-(4-(β-chloro-ethylsulfonyl)-butyryl-amino)-benzene-2,5-disulfonic acid | 2-Aminonaphthalene-1,5-disulfonic acid → 2-acetylamino-5-hydroxynaphthalene-7-sulfonic acid, hydrolysed | orange |
| 168 | 1-Amino-4-(4-(β-chloro-ethylsulfonyl)-butyryl-amino)-benzene-2,5-disulfonic acid | 2-Aminonaphthalene-3,6,8-trisulfonic acid → 2-acetylamino-5-hydroxynaphthalene-7-sulfonic acid, hydrolysed | orange |
| 169 | 1-Amino-4-(4-(β-chloro-ethylsulfonyl)-butyryl-amino)-benzene-2,5-disulfonic acid | 1-Amino-4-methoxybenzene-2-sulfonic acid → 2-amino-5-hydroxynaphthalene-7-sulfonic acid | scarlet |
| 170 | 1-Amino-4-(4-(β-chloro-ethylsulfonyl)-butyryl-amino)-benzene-2,5-disulfonic acid | 1-Amino-4-methoxybenzene-2-sulfonic acid → 2-methylamino-5-hydroxynaphthalene-7-sulfonic acid | scarlet |
| 171 | 1-Amino-4-(4-(β-chloro-ethylsulfonyl)-butyryl-amino)-benzene-2,5-disulfonic acid | 1-Amino-3-acetylaminobenzene-6-sulfonic acid → 1-benzoylamino-8-hydroxynaphthalene-3,6-disulfonic acid, hydrolysed | bluish red |
| 172 | 1-Amino-4-(4-(β-chloro-ethylsulfonyl)-butyryl-amino)-benzene-2,5-disulfonic acid | 1-Amino-4-acetylaminobenzene-2-sulfonic acid → 2-amino-8-hydroxynaphthalene-6-sulfonic acid, hydrolysed | bluish red |
| 173 | 1-Amino-4-(4-(β-chloro-ethylsulfonyl)-butyryl-amino)-benzene-2,5-disulfonic acid | 1-Amino-3-acetylaminobenzene-6-sulfonic acid → 1-amino-8-hydroxy-2-(4'-sulfophenylazo)-naphthalene-3,6-disulfonic acid, hydrolysed | blue |
| 174 | 1-Amino-4-(4-(β-chloro-ethylsulfonyl)-butyryl-amino)-benzene-2,5-disulfonic acid | 1-Amino-3-acetylaminobenzene-6-sulfonic acid → 1-amino-8-hydroxy-2-(2',5'-sulfophenylazo)-naphthalene-3,6-disulfonic acid, hydrolysed | blue |

TABLE 1-continued

| No. | Intermediate | Chromophore | Hue on cotton |
|---|---|---|---|
| 175 | 1-Amino-4-(4-(β-chloro-ethylsulfonyl)-butyryl-amino)-benzene-2,5-di-sulfonic acid | N—(2-Hydroxy-3,5-disulfophenyl)-N'—(2'-carboxy-4'-aminophenyl)-ms-phenylformazan, Cu complex | blue |
| 176 | 1-Amino-4-(4-(β-chloro-ethylsulfonyl)-butyryl-amino)-benzene-2,5-di-sulfonic acid | N—(2-Carboxy-4-sulfophenyl)-N'—(2'-hydroxy-3'-amino-5'-sulfophenyl)-ms-phenylformazan, Cu complex | blue |
| 177 | 1-Amino-4-(4-(β-chloro-ethylsulfonyl)-butyryl-amino)-benzene-2,5-di-sulfonic acid | ½ equivalent of 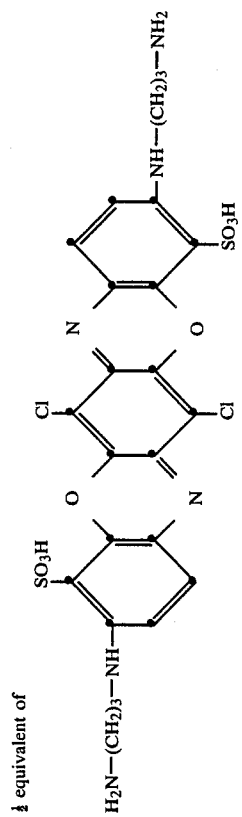 H$_2$N—(CH$_2$)$_3$—NH | blue |
| 178 | 1-Amino-4-(4-(β-chloro-ethylsulfonyl)-butyryl-amino)-benzene-2,5-di-sulfonic acid | ½ equivalent of 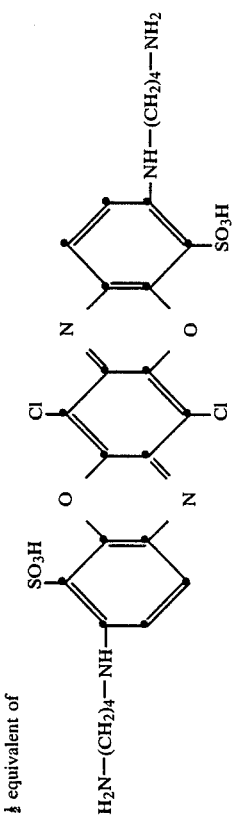 H$_2$N—(CH$_2$)$_4$—NH | blue |
| 179 | 1-Amino-4-(4-(β-chloro-ethylsulfonyl)-butyryl-amino)-benzene-2,5-di-sulfonic acid | 0.8 equivalent of CuPc—(3)—... 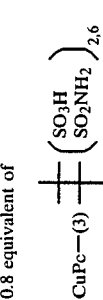 | turquoise blue |

TABLE 1-continued

| No. | Intermediate | Chromophore | Hue on cotton |
|---|---|---|---|
| 180 | 1-Amino-4-(4-(β-chloro-ethylsulfonyl)-butyryl-amino)-benzene-2,5-di-sulfonic acid | ¼ equivalent of  | turquoise blue |
| 181 | 1-Amino-4-(4-vinyl-sulfonylbutyrylamino)-benzene-2,5-disulfonic acid | 2-Aminonaphthalene-3,6,8-trisulfonic acid ⟶ 1-amino-3-acetylaminobenzene | reddish yellow |
| 182 | 1-Amino-4-(4-vinyl-sulfonylbutyrylamino)-benzene-2,5-disulfonic acid | 2-Aminonaphthalene-3,6,8-trisulfonic acid ⟶ 3-aminophenylurea | reddish yellow |
| 183 | 1-Amino-4-(4-vinyl-sulfonylbutyrylamino)-benzene-2,5-disulfonic acid | 1-Amino-3-acetylaminobenzene-6-sulfonic acid ⟶ 1-ethyl-3-sulfomethyl-4-methyl-6-hydroxypyrid-2-one-5-carboxamide, hydrolysed | yellow |
| 184 | 1-Amino-4-(4-vinyl-sulfonylbutyrylamino)-benzene-2,5-disulfonic acid | 1-Amino-3-acetylaminobenzene-6-sulfonic acid ⟶ 1-ethyl-3-aminocarbonyl-4-methyl-6-hydroxypyrid-2-one, hydrolysed | yellow |
| 185 | 1-Amino-4-(4-vinyl-sulfonylbutyrylamino)-benzene-2,5-disulfonic acid | 2-Aminonaphthalene-1,5-disulfonic acid ⟶ 2-acetylamino-5-hydroxynaphthalene-7-sulfonic acid, hydrolysed | orange |
| 186 | 1-Amino-4-(4-vinyl-sulfonylbutyrylamino)-benzene-2,5-disulfonic acid | 2-Aminonaphthalene-3,6,8-trisulfonic acid ⟶ 2-acetylamino-5-hydroxynaphthalene-7-sulfonic acid, hydrolysed | orange |
| 187 | 1-Amino-4-(4-vinyl-sulfonylbutyrylamino)-benzene-2,5-disulfonic acid | 1-Amino-4-methoxybenzene-2-sulfonic acid ⟶ 2-amino-5-hydroxynaphthalene-7-sulfonic acid | scarlet |

TABLE 1-continued

| No. | Intermediate | Chromophore | Hue on cotton |
|---|---|---|---|
| 188 | 1-Amino-4-(4-vinyl-sulfonylbutyrylamino)-benzene-2,5-disulfonic acid | 1-Amino-4-methoxybenzene-2-sulfonic acid ⟶ 2-methylamino-5-hydroxynaphthalene-7-sulfonic acid | scarlet |
| 189 | 1-Amino-4-(4-vinyl-sulfonylbutyrylamino)-benzene-2,5-disulfonic acid | 1-Amino-3-acetylaminobenzene-6-sulfonic acid ⟶ 1-benzoylamino-8-hydroxynaphthalene-3,6-disulfonic acid | bluish red |
| 190 | 1-Amino-4-(4-vinyl-sulfonylbutyrylamino)-benzene-2,5-disulfonic acid | 1-Amino-4-acetylaminobenzene-2-sulfonic acid ⟶ acid 2-amino-8-hydroxynaphthalene-6-sulfonic acid, hydrolysed | bluish red |
| 191 | 1-Amino-4-(4-vinyl-sulfonylbutyrylamino)-benzene-2,5-disulfonic acid | 1-Amino-3-acetylaminobenzene-6-sulfonic acid ⟶ 1-amino-8-hydroxy-2-(4'-sulfophenylazo)-naphthalene-3,6-disulfonic acid, hydrolysed | blue |
| 192 | 1-Amino-4-(4-vinyl-sulfonylbutyrylamino)-benzene-2,5-disulfonic acid | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | blue |
| 193 | 1-Amino-4-(4-vinyl-sulfonylbutyrylamino)-benzene-2,5-disulfonic acid | N—(2-Hydroxy-3,5-disulfophenyl)-N'—(2'-carboxy-4'-aminophenyl)-ms-phenylformazan, Cu complex | blue |
| 194 | 1-Amino-4-(4-vinyl-sulfonylbutyrylamino)-benzene-2,5-disulfonic acid | N—(2-Carboxy-5-sulfophenyl)-N'—(2'-hydroxy-3'-amino-5'-sulfophenyl)-ms-phenylformazan, Cu complex | blue |
| 195 | 1-Amino-4-(4-vinyl-sulfonylbutyrylamino)-benzene-2,5-disulfonic acid | ½ equivalent of  | blue |

TABLE 1-continued
| No. | Intermediate | Chromophore | Hue on cotton |
|-----|--------------|-------------|---------------|
| 196 | 1-Amino-4-(4-vinyl-sulfonylbutyrylamino)-benzene-2,5-disulfonic acid | ½ equivalent of 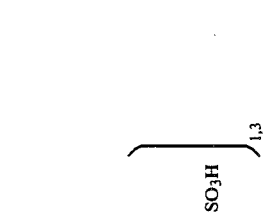 | blue |
| 197 | 1-Amino-4-(4-vinyl-sulfonylbutyrylamino)-benzene-2,5-disulfonic acid | 0.8 equivalent of 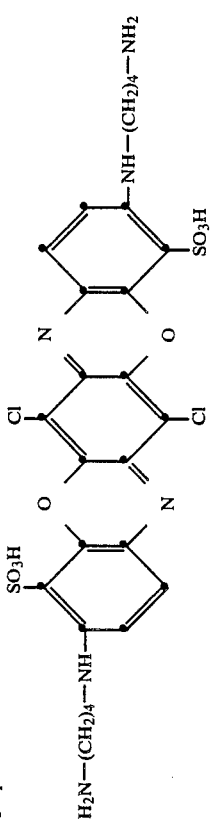 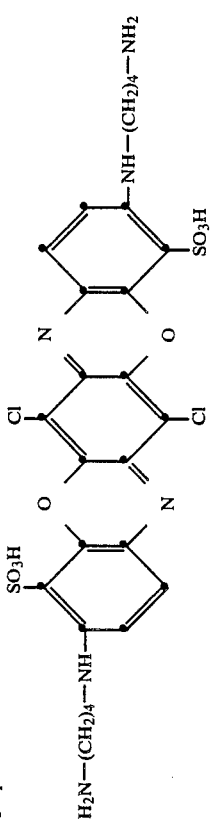 | turquoise blue |
| 198 | 1-Amino-4-(4-vinyl-sulfonylbutyrylamino)-benzene-2,5-disulfonic acid | ½ equivalent of 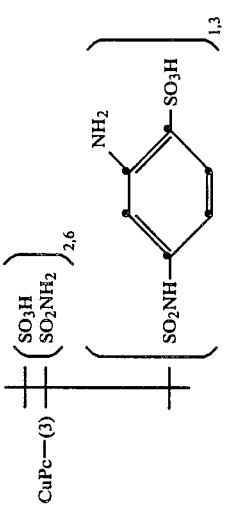 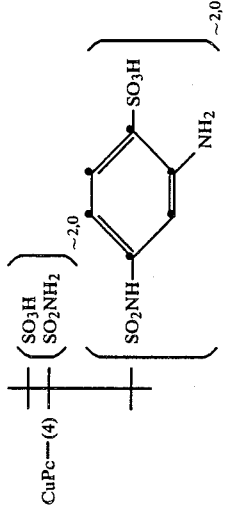 | turquoise blue |

EXAMPLE 2

16.4 parts of the dye of the formula

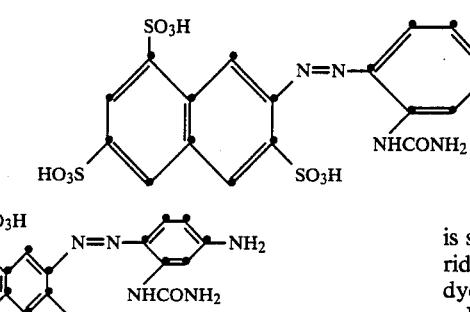

are reacted at 0° to 5° with 4.3 parts of 2,4,6-trifluoro-1,3,5-triazine in accordance with the indications in Example 1. After addition of a neutral solution of 5.9 parts of 1,3-diaminobenzene-4-sulfonic acid in 100 ml of water the temperature is raised to 20° to 25° in the course of 2 to 3 hours during which the pH of the reaction mixture is maintained at 6.0 by continuous addition of 2N sodium hydroxide solution. After the reaction has ended, the reaction mixture is clarified and the resultant intermediate is salted out at pH 7.0 by sprinkling in potassium chloride, is filtered off, is washed and is dried in vacuo.

14.6 parts of the intermediate thus obtained, which still caries an acylatable amino group, are dissolved in 2000 ml of water. 4.8 part of 2,3-dibromopropionyl chloride are added dropwise at 10° in the course of 10 minutes during which the pH of the reaction mixture is maintained at 7.0 to 7.5 by simultaneous addition of 2N sodium hydroxide solution. After the reaction has ended, the resultant reactive dye of the formula

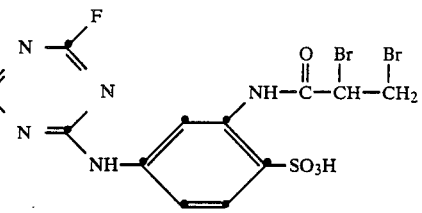

is salted out at pH 7.0 by sprinkling in potassium chloride, is filtered off, is washed and is dried in vacuo. It dyes cotton in reddish yellow shades.

Example 2 is repeated, except that the 16.4 parts of the dye of the first formula in Example 2 are condensed not with 4.3 parts of 2,4,6-trifluoro-1,3,5-triazine but with 5.8 parts of 2,4,6-trichloro-1,3,5-triazine, affording a further useful reactive dye of the formula

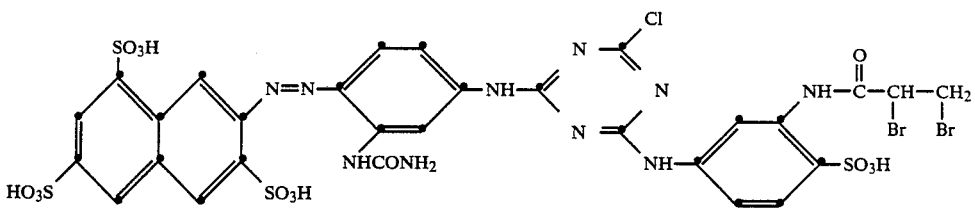

It dyes cotton in reddish yellow shades.

Further reactive dyes which dye cotton in the hues indicated in Table 2 column 5 are obtained when the amino-containing chromophores indicated in column 2 are reacted in accordance with the indications in Example 2 first with 2,4,6-trifluoro-1,3,5-triazine or with 2,4,6-trichloro-1,3,5-triazine and then with the diamino compound indicated in column 3. The intermediates thus obtained are converted into the reactive dyes by reaction with the acylating agent indicated in column 4 in accordance with the indications in Example 2.

TABLE 2

| No. | Chromophore | Diamino compound | Acylating agent | Hue on cotton |
|---|---|---|---|---|
| 1 | 2-Aminonaphthalene-3,6,8-trisulfonic acid ⟶ 1-amino-3-acetylaminobenzene | 1,3-Diaminobenzene-4-sulfonic acid | 2,3-Dibromopropionyl chloride | reddish yellow |
| 2 | 1-Amino-3-acetylaminobenzene-6-sulfonic acid ⟶ 1-ethyl-3-sulfomethyl-4-methyl-6-hydroxypyrid-2-one-5-carboxamide, hydrolysed | 1,3-Diaminobenzene-4-sulfonic acid | 2,3-Dibromopropionyl chloride | yellow |
| 3 | 1-Amino-3-acetylaminobenzene-6-sulfonic acid ⟶ 1-ethyl-3-aminocarbonyl-4-methyl-6-hydroxypyrid-2-one, hydrolysed | 1,3-Diaminobenzene-4-sulfonic acid | 2,3-Dibromopropionyl chloride | yellow |
| 4 | 2-Aminonaphthalene-1,5-disulfonic acid ⟶ 2-acetylamino-5-hydroxynaphthalene-7-sulfonic acid, hydrolysed | 1,3-Diaminobenzene-4-sulfonic acid | 2,3-Dibromopropionyl chloride | orange |
| 5 | 2-Aminonaphthalene-3,6,8-trisulfonic acid ⟶ 2-acetylamino-5-hydroxynaphthalene-sulfonic acid, hydrolysed | 1,3-Diaminobenzene-4-sulfonic acid | 2,3-Dibromopropionyl chloride | orange |
| 6 | 1-Amino-4-methoxybenzene-2-sulfonic acid ⟶ 2-amino-5-hydroxynaphthalene-7-sulfonic acid | 1,3-Diaminobenzene-4-sulfonic acid | 2,3-Dibromopropionyl chloride | scarlet |
| 7 | 1-Amino-4-methoxybenzene-2-sulfonic acid ⟶ 2-methylamino-5-hydroxynaphthalene-7-sulfonic acid | 1,3-Diaminobenzene-4-sulfonic acid | 2,3-Dibromopropionyl chloride | scarlet |
| 8 | 1-Amino-3-acetylaminobenzene-6-sulfonic acid ⟶ 1-benzoylamino-8-hydroxynaphthalene-3,6-disulfonic acid, hydrolysed | 1,3-Diaminobenzene-4-sulfonic acid | 2,3-Dibromopropionyl chloride | bluish red |
| 9 | 1-Amino-4-acetylaminobenzene-2-sulfonic acid ⟶ 2-amino-8-hydroxynaphthalene-6-sulfonic acid, hydrolysed | 1,3-Diaminobenzene-4-sulfonic acid | 2,3-Dibromopropionyl chloride | bluish red |
| 10 | 1-Amino-3-acetylaminobenzene-6-sulfonic acid ⟶ 1-amino-8-hydroxy-2-(4'-sulfophenylazo)-naphthalene-3,6-disulfonic acid, hydrolysed | 1,3-Diaminobenzene-4-sulfonic acid | 2,3-Dibromopropionyl chloride | blue |
| 11 | 1-Amino-3-acetylaminobenzene-6-sulfonic acid ⟶ 1-amino-8-hydroxy-2-(2',5'-disulfophenylazo)-naphthalene-3,6-disulfonic acid, hydrolysed | 1,3-Diaminobenzene-4-sulfonic acid | 2,3-Dibromopropionyl chloride | blue |
| 12 | N—(2-Hydroxy-3,5-disulfophenyl)-N'—(2'-carboxy-4'-aminophenyl)-ms-phenylformazan, Cu complex | 1,3-Diaminobenzene-4-sulfonic acid | 2,3-Dibromopropionyl chloride | blue |
| 13 | N—(2-Carboxy-5-sulfophenyl)-N'—(2'-hydroxy-3'-amino-5'-sulfophenyl)-ms-phenylformazan, Cu complex | 1,3-Diaminobenzene-4-sulfonic acid | 2,3-Dibromopropionyl chloride | blue |

TABLE 2-continued

| No. | Chromophore | Diamino compound | Acylating agent | Hue on cotton |
|---|---|---|---|---|
| 14 | ½ equivalent of H₂N—(CH₂)₃—NH-[structure with SO₃H, Cl, N, O groups]—NH—(CH₂)₃—NH₂ with SO₃H | 1,3-Diaminobenzene-4-sulfonic acid | 2,3-Dibromopropionyl chloride | blue |
| 15 | ½ equivalent of H₂N—(CH₂)₄—NH-[structure with SO₃H, Cl, N, O groups]—NH—(CH₂)₄—NH₂ with SO₃H | 1,3-Diaminobenzene-4-sulfonic acid | 2,3-Dibromopropionyl chloride | blue |
| 16 | 0.8 equivalent of CuPc-(3)$\left(\begin{array}{c}SO_3H\\SO_2NH_2\end{array}\right)_{2,6}$ $\left(SO_2NH-[benzene with NH_2, SO_3H]\right)_{1,3}$ | 1,3-Diaminobenzene-4-sulfonic acid | 2,3-Dibromopropionyl chloride | turquoise blue |
| 17 | ½ equivalent of CuPc-(4)$\left(\begin{array}{c}SO_3H\\SO_2NH_2\end{array}\right)_{\sim 2,0}$ $\left(SO_2NH-[benzene with SO_3H, NH_2]\right)_{\sim 2,0}$ | 1,3-Diaminobenzene-4-sulfonic acid | 2,3-Dibromopropionyl chloride | turquoise blue |
| 18 | 2-Aminonaphthalene-3,6,8-trisulfonic acid ⟶ 1-amino-3-acetylaminobenzene | 1,3-Diaminobenzene-4-sulfonic acid | 2,3-Dichloropropionyl chloride | reddish yellow |

TABLE 2-continued

| No. | Chromophore | Diamino compound | Acylating agent | Hue on cotton |
|---|---|---|---|---|
| 19 | 2-Aminonaphthalene-3,6,8-trisulfonic acid → 3-aminophenylurea | 1,3-Diaminobenzene-4-sulfonic acid | 2,3-Dichloropropionyl chloride | reddish yellow |
| 20 | 1-Amino-3-acetylaminobenzene-6-sulfonic acid → 1-amino-8-hydroxy-2-(4'-sulfophenylazo)-naphthalene-3,6-disulfonic acid, hydrolysed | 1,3-Diaminobenzene-4-sulfonic acid | 2,3-Dichloropropionyl chloride | blue |
| 21 | 1-Amino-3-acetylaminobenzene-6-sulfonic acid → 1-amino-8-hydroxy-2-(2',5'-disulfophenylazo)-naphthalene-3,6-disulfonic acid, hydrolysed | 1,3-Diaminobenzene-4-sulfonic acid | 2,3-Dichloropropionyl chloride | blue |
| 22 | 2-Aminonaphthalene-3,6,8-trisulfonic acid → 3-aminophenylurea | 1,4-Diaminobenzene-2-sulfonic acid | 2,3-Dibromopropionyl chloride | reddish yellow |
| 23 | 1-Amino-3-acetylaminobenzene-6-sulfonic acid → 1-amino-8-hydroxy-2-(4'-sulfophenylazo)-naphthalene-3,6-disulfonic acid, hydrolysed | 1,4-Diaminobenzene-2-sulfonic acid | 2,3-Dibromopropionyl chloride | blue |
| 24 | 1-Amino-3-acetylaminobenzene-6-sulfonic acid → 1-amino-8-hydroxy-2-(2',5'-disulfophenylazo)-naphthalene-3,6-disulfonic acid, hydrolysed | 1,4-Diaminobenzene-2-sulfonic acid | 2,3-Dibromopropionyl chloride | blue |
| 25 | 2-Aminonaphthalene-3,6,8-trisulfonic acid → 3-aminophenylurea | 1,4-Diaminobenzene-2-sulfonic acid | 4-($\beta$-Chloroethylsulfonyl)-butyryl chloride dissolved in dioxane | reddish yellow |
| 26 | 2-Aminonaphthalene-3,6,8-trisulfonic acid → 3-aminophenylurea | 1,3-Diaminobenzene-4-sulfonic acid | 4-($\beta$-Chloroethylsulfonyl)-butyryl chloride dissolved in dioxane | reddish yellow |
| 27 | N—(2-Hydroxy-3,5-disulfophenyl)-N'—(2'-carboxy-4'-aminophenyl)-ms-(2''-sulfophenyl)-formazan, Cu complex | 1,3-Diaminobenzene-4-sulfonic acid | 4-($\beta$-Chloroethylsulfonyl)-butyryl chloride | blue |
| 28 | N—(2-Hydroxy-3,5-disulfophenyl)-N'—(2'-carboxy-4'-aminophenyl)-ms-(2''-sulfophenyl)-formazan, Cu complex | 1,4-Diaminobenzene-2-sulfonic acid | 4-($\beta$-Chloroethylsulfonyl)-butyryl chloride | blue |
| 29 | 1-Aminobenzene-2,5-disulfonic acid → 2-amino-5-hydroxynaphthalene-7-sulfonic acid | 1,3-Diaminobenzene-4-sulfonic acid | 4-($\beta$-Chloroethylsulfonyl)-butyryl chloride | scarlet |
| 30 | 1-Amino-4-methoxybenzene-2-sulfonic acid → 2-amino-5-hydroxynaphthalene-7-sulfonic acid | 1,4-Diaminobenzene-2-sulfonic acid | 4-($\beta$-Chloroethylsulfonyl)-butyryl chloride | scarlet |
| 31 | 2-Aminonaphthalene-1,5-disulfonic acid → 2-amino-5-hydroxynaphthalene-7-sulfonic acid | 1,4-Diaminobenzene-2-sulfonic acid | 4-($\beta$-Chloroethylsulfonyl)-butyryl chloride | orange |
| 32 | 2-Aminonaphthalene-3,6,8-trisulfonic acid → 1-amino-3-acetylaminobenzene | 1,3-Diaminobenzene-4-sulfonic acid | 4-($\beta$-Chloroethylsulfonyl)-butyryl chloride | reddish yellow |
| 33 | 1-Amino-3-acetylaminobenzene-6-sulfonic acid → 1-ethyl-3-sulfomethyl-4-methyl-6-hydroxypyrid-2-one-5-carboxamide, hydrolysed | 1,3-Diaminobenzene-4-sulfonic acid | 4-($\beta$-Chloroethylsulfonyl)-butyryl chloride | yellow |

TABLE 2-continued

| No. | Chromophore | Diamino compound | Acylating agent | Hue on cotton |
|---|---|---|---|---|
| 34 | 1-Amino-3-acetylaminobenzene-6-sulfonic acid →<br>1-ethyl-3-aminocarbonyl-4-methyl-6-hydroxypyrid-2-one, hydrolysed | 1,3-Diaminobenzene-4-sulfonic acid | 4-(β-Chloroethylsulfonyl)-butyryl chloride | yellow |
| 35 | 2-Aminonaphthalene-1,5-disulfonic acid →<br>2-acetylamino-5-hydroxynaphthalene-7-sulfonic acid, hydrolysed | 1,3-Diaminobenzene-4-sulfonic acid | 4-(β-Chloroethylsulfonyl)-butyryl chloride | orange |
| 36 | 2-Aminonaphthalene-3,6,8-trisulfonic acid →<br>2-acetylamino-5-hydroxynaphthalene-7-sulfonic acid, hydrolysed | 1,3-Diaminobenzene-4-sulfonic acid | 4-(β-Chloroethylsulfonyl)-butyryl chloride | orange |
| 37 | 1-Amino-4-methoxybenzene-2-sulfonic acid →<br>2-amino-5-hydroxynaphthalene-7-sulfonic acid | 1,3-Diaminobenzene-4-sulfonic acid | 4-(β-Chloroethylsulfonyl)-butyryl chloride | scarlet |
| 38 | 1-Amino-4-methoxybenzene-2-sulfonic acid →<br>2-methylamino-5-hydroxynaphthalene-7-sulfonic acid | 1,3-Diaminobenzene-4-sulfonic acid | 4-(β-Chloroethylsulfonyl)-butyryl chloride | scarlet |
| 39 | 1-Amino-3-acetylaminobenzene-6-sulfonic acid →<br>1-benzoylamino-8-hydroxynaphthalene-3,6-disulfonic acid, hydrolysed | 1,3-Diaminobenzene-4-sulfonic acid | 4-(β-Chloroethylsulfonyl)-butyryl chloride | bluish red |
| 40 | 1-Amino-4-acetylaminobenzene-2-sulfonic acid →<br>2-amino-8-hydroxynaphthalene-6-sulfonic acid, hydrolysed | 1,3-Diaminobenzene-4-sulfonic acid | 4-(β-Chloroethylsulfonyl)-butyryl chloride | bluish red |
| 41 | 1-Amino-3-acetylaminobenzene-6-sulfonic acid →<br>1-amino-8-hydroxy-2-(4'-sulfophenylazo)-naphthalene-3,6-disulfonic acid, hydrolysed | 1,3-Diaminobenzene-4-sulfonic acid | 4-(β-Chloroethylsulfonyl)-butyryl chloride | blue |
| 42 | 1-Amino-3-acetylaminobenzene-6-sulfonic acid →<br>1-amino-8-hydroxy-2-(2',5'-disulfophenylazo)-naphthalene-3,6-disulfonic acid, hydrolysed | 1,3-Diaminobenzene-4-sulfonic acid | 4-(β-Chloroethylsulfonyl)-butyryl chloride | blue |
| 43 | N—(2-Hydroxy-3,5-disulfophenyl)-N'—(2'-carboxy-4'-aminophenyl)-ms-phenylformazan, Cu complex | 1,3-Diaminobenzene-4-sulfonic acid | 4-(β-Chloroethylsulfonyl)-butyryl chloride | blue |
| 44 | N—(2-Carboxy-5-sulfophenyl)-N'—(2'-hydroxy-3'-amino-5'-sulfophenyl)-ms-phenylformazan, Cu complex | 1,3-Diaminobenzene-4-sulfonic acid | 4-(β-Chloroethylsulfonyl)-butyryl chloride | blue |
| 45 | ½ equivalent of | 1,3-Diaminobenzene-4-sulfonic acid | 4-(β-Chloroethylsulfonyl)-butyryl chloride | blue |

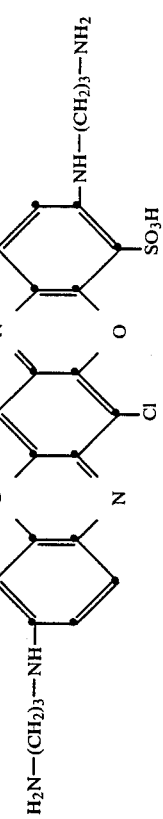

TABLE 2-continued

| No. | Chromophore | Diamino compound | Acylating agent | Hue on cotton |
|---|---|---|---|---|
| 46 | ½ equivalent of 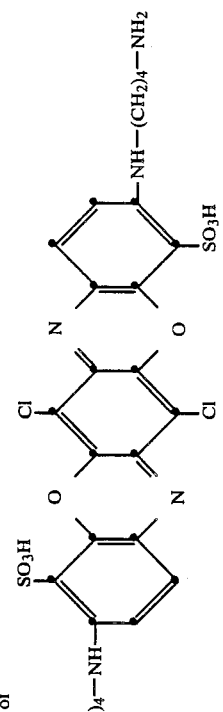 | 1,3-Diaminobenzene-4-sulfonic acid | 4-(β-Chloroethylsulfonyl)-butyryl chloride | blue |
| 47 | 0.8 equivalent of 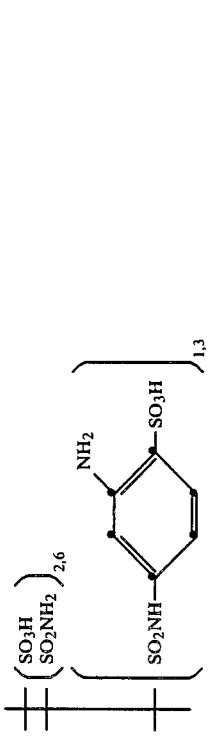 | 1,3-Diaminobenzene-4-sulfonic acid | 4-(β-Chloroethylsulfonyl)-butyryl chloride | turquoise blue |
| 48 | ½ equivalent of 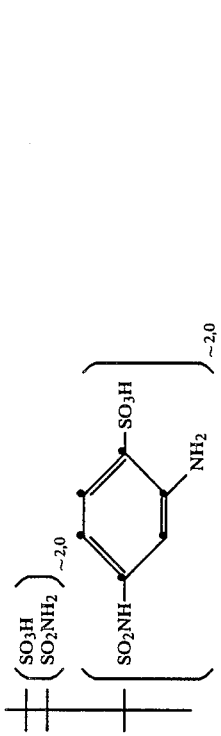 | 1,3-Diaminobenzene-4-sulfonic acid | 4-(β-Chloroethylsulfonyl)-butyryl chloride | turquoise blue |

Dyeing method I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

Dyeing method IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

Dyeing method V 6 parts of the reactive dye obtained in Example 1 are dissolved in 50 parts of water; to this solution are added 50 parts of a solution which contains per liter 16 g of sodium hydroxide and 0.04 liter of 38° Bé sodium silicate. The resulting solution is applied to a cotton fabric on a padmangle in such a way that its weight increases by 70%, and the fabric is then wound onto a beam. In this state the cotton fabric is left to stand at room temperature for 10 hours. The dyed fabric is then rinsed, is soaped off at the boil with a nonionic detergent for a quarter of an hour, is rinsed once more and is dried.

Dyeing method VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 to 60 seconds, is rinsed, is soaped off at the boil with a 0.3% strength solution of a nonionic detergent for a quarter of an hour, is rinsed and is dried.

Printing method I 3 parts of the reactive dye obtained in Example 1 are sprinkled with high-speed stirring into 100 parts of a stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

Printing method II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

We claim:

1. A reactive dye of the formula

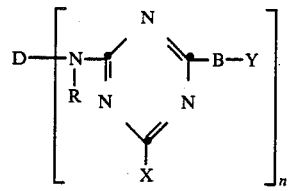

wherein
- D is the radical of a monoazo, polyazo, metal complex azo, anthraquinone, phthalocyanine, formazan, azomethine or dioxazine dye;
- R is hydrogen or alkyl which contains from 1 to 4 carbon atoms and which is unsubstituted or substituted by halogen, hydroxy, cyano, carboxyl, sulfo or alkoxy with 1 to 4 carbon atoms;
- X is fluorine, chlorine or bromine;
- Y is beta-chloroethylsulfonylbutyryl or vinylsulfonylbutyryl;
- n is 1 or 2; and B is a radical of the formula

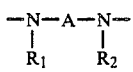

wherein
A is sulfophenylene or disulfophenylene; and
$R_1$ and $R_2$, independently of each other, are hydrogen; alkyl which contains 1 to 4 carbon atoms and which is unsubstituted or substituted by halogen, hydroxy, cyano, carboxyl, sulfo or alkoxy with 1 to 4 carbon atoms; or phenyl which is unsubstituted or substituted by halogen, cyano, carboxyl, sulfo, alkyl with 1 to 4 carbon atoms, or alkoxy with 1 to 4 carbon atoms.

2. A reactive dye according to claim 1 in which D is the radical of a monoazo or disazo dye.

3. A reactive dye according to claim 1 in which D is the radical of a metal complex azo or formazan dye.

4. A reactive dye according to claim 1 in which D is the radical of an anthraquinone dye.

5. A reactive dye according to claim 3 in which D is the radical of a 1:1 copper complex azo dye containing benzene or naphthalene radicals as coupling and diazo components and the copper ion is bonded to a metallizable group in each component ortho to the azo bridge.

6. A reactive dye according to claim 1 of the formula

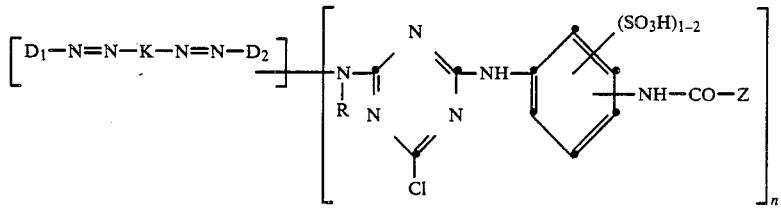

wherein
D1 is a radical of a benzene or naphthalene diazo component;
K is a radical of a benzene, naphthalene, pyridine, pyridone or pyrazolone coupling component; and
R is hydrogen, methyl or ethyl.

7. A reactive dye according to claim 6 wherein D1—N=N—K is coordinated in a 1:1 complex with copper.

8. A reactive dye according to claim 1 of the formula

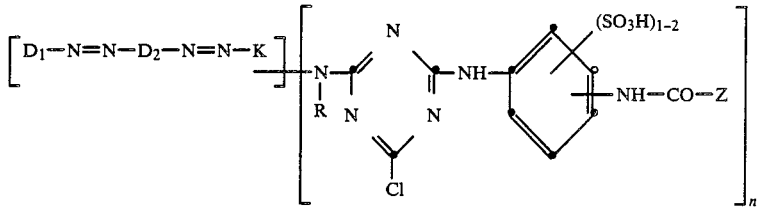

wherein
D1 and D2 are each a radical of a benzene or naphthalene diazo component;
K is a radical of a benzene, naphthalene, pyridine, pyrimidine or pyrazolone coupling component;
R is hydrogen, methyl or ethyl; and
n is 1 or 2;
wherein, if n is 1, the triazinyl radical is bound through —N(R)— to the diazo component D1 or to the coupling component K; and if n is 2, the two triazinyl radicals are bound one each through —N(R)— to D1 and K.

9. A reactive dye according to claim 8 wherein D1—N=N—K is coordinated in a 1:1 complex with copper.

10. A reactive dye according to claim 1 of the formula

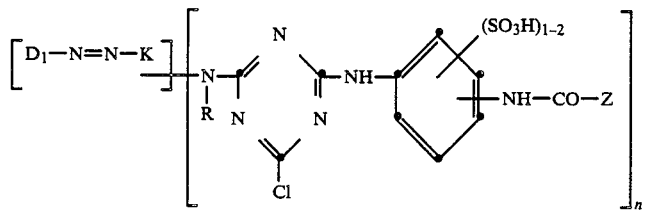

wherein
D1 and D2 are each a radical of a benzene or naphthalene diazo component;
K is a radical of an aminonaphthalsulfonic acid coupling component;
R is hydrogen, methyl or ethyl; and
n is 1 or 2;
wherein, if n is 1, the triazinyl radical is bound through —N(R)— to the diazo component D1 or to the diazo component D2; and if n is 2, the two triazinyl radicals are bound one each through —N(R)— to D1 and D2.

11. A reactive dye according to claim 10 wherein D1—N=N—K is coordinated in a 1:1 complex with copper.